(12) United States Patent
Ozzie

(10) Patent No.: US 11,537,631 B2
(45) Date of Patent: Dec. 27, 2022

(54) DATA SYSTEM ON A MODULE (DSOM) FOR CONNECTING COMPUTING DEVICES AND CLOUD-BASED SERVICES

(71) Applicant: Blues Inc., Manchester, MA (US)

(72) Inventor: Raymond Edward Ozzie, Seattle, WA (US)

(73) Assignee: Blues Inc., Manchester, MA (US)

( * ) Notice: Subject to any disclaimer, the term of this patent is extended or adjusted under 35 U.S.C. 154(b) by 360 days.

(21) Appl. No.: 16/521,922

(22) Filed: Jul. 25, 2019

(65) Prior Publication Data

US 2020/0034372 A1    Jan. 30, 2020

Related U.S. Application Data

(60) Provisional application No. 62/703,054, filed on Jul. 25, 2018.

(51) Int. Cl.
*G06F 16/27* (2019.01)
*H04L 67/52* (2022.01)
(Continued)

(52) U.S. Cl.
CPC .......... *G06F 16/273* (2019.01); *G06F 16/275* (2019.01); *H04L 67/52* (2022.05);
(Continued)

(58) Field of Classification Search
CPC ...... G06F 16/27; G06F 16/273; G06F 16/275; H04L 63/0823; H04L 67/18; H04L 67/2804; H04L 67/561; H04W 4/02
See application file for complete search history.

(56) References Cited

U.S. PATENT DOCUMENTS 8,965,333 B1    2/2015  Shreiber
10,291,477 B1 * 5/2019  Askar ................... H04W 4/70
(Continued)

OTHER PUBLICATIONS

International Search Report and Written Opinion of the International Searching Authority for International PCT Application No. PCT/US2019/043372 dated Oct. 21, 2019.
(Continued)

*Primary Examiner* — Emmanuel L Moise
*Assistant Examiner* — Xiang Yu
(74) *Attorney, Agent, or Firm* — Brian J. Colandreo; Jeffery T. Placker; Holland & Knight LLP

(57) ABSTRACT

A communication device (e.g., a data system on a module (DSoM)/a Data System in a Package (DSiP)) for communicatively coupling a computing device with a cloud-based service to synchronize one or more data modifications, on an asynchronous basis with respect to one another is provided. The communication device may be configured to be communicatively coupled to the computing device and may include a wireless cellular transceiver. The communication device may be configured to one or more of transmit at least one data object from the computing device to the cloud-based service and receive at least one data object from the cloud-based service. Embodiments of the present disclosure may provide a distributed replicated spatiotemporal database packaged on a communication device and integrated with an internet-based secure communication hub.

19 Claims, 12 Drawing Sheets

(51) Int. Cl.
  *H04L 67/561* (2022.01)
  *H04W 4/02* (2018.01)
  *H04L 9/40* (2022.01)

(52) U.S. Cl.
  CPC ............. *H04L 67/561* (2022.05); *H04W 4/02* (2013.01); *H04L 63/0823* (2013.01)

(56) References Cited

U.S. PATENT DOCUMENTS

| | | | |
|---|---|---|---|
| 2002/0147850 A1* | 10/2002 | Richards | H04L 9/40 709/248 |
| 2006/0098668 A1 | 5/2006 | Dona | |
| 2012/0303491 A1* | 11/2012 | Hill | G06Q 30/0601 705/27.2 |
| 2013/0272199 A1 | 10/2013 | Agiwal | |
| 2013/0275509 A1* | 10/2013 | Micucci | H04L 65/403 709/204 |
| 2013/0326495 A1 | 12/2013 | Reunamaki et al. | |
| 2015/0009067 A1 | 1/2015 | Rudow et al. | |
| 2016/0100035 A1 | 4/2016 | Martis | |
| 2016/0124722 A1 | 5/2016 | Mathew | |
| 2016/0328902 A1 | 11/2016 | Matthews, III | |
| 2018/0034664 A1 | 2/2018 | Mulligan | |
| 2019/0067999 A1* | 2/2019 | Yu | H02J 50/90 |
| 2019/0294889 A1* | 9/2019 | Sriram | G06V 20/584 |

OTHER PUBLICATIONS

International Search Report and Written Opinion of the International Searching Authority for International PCT Application No. PCT/US2019/043383 dated Dec. 4, 2019.
Non-Final Office Action issued in U.S. Appl. No. 16/521,960 dated Sep. 23, 2020.
Notice of Allowance issued in U.S. Appl. No. 16/521,960 dated Feb. 16, 2021.
Communication pursuant to Rules 70(2) and 70a(2) EPC enclosing Extended European Search Report issued in European Patent Application No. 19839804.2 dated Apr. 26, 2022.
Communication pursuant to Rules 70(2) and 70a(2) EPC enclosing Extended European Search Report issued in European Patent Application No. 1941894.9 dated May 2, 2022.

* cited by examiner

Safecast Environmental Monitoring  User 1

Project identifier that will automatically be associated with this communication device project product.org.safecast.*
product.org.safecast.pointcast
product.org.safecast.pointcast.ninja
product.org.safecast.air
product.org.safecast.solarcast
product.org.safecast.solarcast.nano
product.org.safecast.bgeigie
product.org.safecast.bgeigie.mini
product.org.safecast.bgeigie.nano Communication encryption between communication device and communication hub ● TLS-encryption sessions only when needed when transferring data for data object arrays expressly tagged as "secure".

○ All sessions are TLS-encrypted (requires more bandwidth at start of session for encryption key exchanges)

Data
All
air.qo
geiger.qo
power.qo
hub.db
High Radiation
Bad Air
New Query...

Devices
All
Fukushima
Hanford
New Fleet...

Settings
> Project
Account
Environment
Routes

DATA SYSTEM ON A MODULE (DSOM) FOR CONNECTING COMPUTING DEVICES AND CLOUD-BASED SERVICES

CROSS-REFERENCE TO RELATED APPLICATIONS

This application claims the benefit of U.S. Provisional Application having Ser. No. 62/703,054 filed on Jul. 25, 2018 and U.S. Provisional Application having Ser. No. 62/807,840 filed on Feb. 20, 2019. Both of the above applications are incorporated by reference herein.

BACKGROUND

The cellular communications industry perspective on communications is dominated by two core assumptions. First, that global interoperability is of prime importance—more important than speed—and that regulations and standards committees are the way that technologies shall be defined. Second, that customers will use whatever they produce—the industry and government will design and build, that industry will forever use the metered cellular business model, and that customers will come. There is zero participation of customers in defining technology or its requirements, and there is zero connection to developers.

The computing/IT industry perspective on communications is generally dominated by two core assumptions: First, that innovators and builders and industry are the way that technologies should be defined. Developers know best, and architectures should be defined forward-thinking for powerful high-end platforms and not focus so much on less-capable platforms of the past. Second, that there are a world of different devices and protocols and networks, and it is the primary job of the dominant platform providers to create generalized abstractions that will support any device, and any application, and will treat all networks as pipes that expose sockets that deliver streams.

Neither of these industries wholly embraces the fact that with regard to cellular-centric massive Internet-of-things (IoT)—billions of devices—neither perspective is acceptable. The low-level nature, and the standards-based constraints of AT commands and modem modules, and custom-negotiated cellular contracts, may be too complex and may not scale. Additionally, the complex nature of certificate management and high-level Linux®/Windows®-based Application Programmable Interfaces (APIs) required to connect to the cloud are simply not realistic for embedded developers trying to do extremely simple things on extremely underpowered inexpensive microcontrollers.

SUMMARY OF DISCLOSURE

In one example implementation, a communication device for communicatively coupling a computing device with a cloud-based service to synchronize one or more data modifications, on an asynchronous basis with respect to one another is provided. The communication device may be configured to be communicatively coupled to the computing device and may include a wireless cellular transceiver. The communication device may be configured to one or more of transmit at least one data object from the computing device to the cloud-based service and receive at least one data object from the cloud-based service. Transmitting the at least one data object from the computing device to the cloud-based service may include receiving the at least one data object from the computing device, modifying at least one data object array of one or more data objects stored in memory of the communication device based upon, at least in part, the received at least one data object, and asynchronously, with respect to the computing device, transmitting, via the wireless cellular transceiver, at least a portion of the modified at least one data object array to the cloud-based service. Receiving the at least one data object from the cloud-based service may include asynchronously, with respect to the computing device, receiving, via the wireless cellular transceiver, at least a portion of the at least one data object array from the cloud-based service, modifying the one or more data objects of the at least one data object array stored in the memory of the computing device based upon, at least in part, the received at least a portion of the at least one data object array, and asynchronously, with respect to the communication device's communication with the cloud-based service, making the one or more modified data objects of the at least one data object array available to the computing device.

One or more of the following example features may be included. The computing device may be a microcontroller. The communication device may be configured to be communicatively coupled to the computing device via a serial link. The serial link may include one or more of Universal Asynchronous Receiver/Transmitter (UART), Universal Serial Bus (USB), Inter-Integrated Circuit (I²C), Serial Peripheral Interface (SPI), MODBUS®, Controller Area Network (CAN) bus, Peripheral Component Interconnect Express (PCIe). The communication device may be configured to receive a communication policy from the computing device. The communication policy may defines one or more communication session criteria for the communication device including one or more of: conserving power, conserving network bandwidth, securing data objects, and prioritizing some data objects with respect to other data objects. The communication device may be further configured to one or more of: generate a schedule for transmitting, via the wireless cellular transceiver, the at least a portion of the data object array to the cloud-based service, based upon, at least in part, the communication policy received from the computing device, and generate a schedule for receiving, via the wireless cellular transceiver, the at least a portion of the data object array from the cloud-based service, based upon, at least in part, the communication policy received from the computing device. The communication device may be configured to add metadata to the at least one data object, the metadata including one or more of time and a location of the communication device. The communication device may be configured to one or more of compress and encrypt the data object based upon, at least in part, the communication policy received from the computing device and the metadata appended to the at least one data object. The at least one data object may be a JavaScript Object Notation (JSON) object. The communication device may be configured to receive, via the wireless cellular transceiver, firmware data in the form of the at least one data object for storage in the memory of the communication device, and receive one or more commands from the computing device to transmit at least a portion of the received firmware data to the computing device for installing the received firmware data on the computing device. The communication device may be configured to one or more of enable and disable the power of its wireless cellular transceiver. The communication device may include a global navigation satellite system (GNSS) system and may be configured to be communicatively coupled to a GNSS antenna. The communication device may include an accelerometer configured to cause the communication device to sample GNSS position data from the GNSS system when the accelerometer detects movement. At fabrication, non-volatile memory of the communication device may be configured to include one or more security keys and a digitally-signed certificate enabling secure authentication of the communication device and communication with the cloud-based service.

In another example implementation, a communication device for communicatively coupling a computing device with a cloud-based service to synchronize one or more data modifications on an asynchronous basis with respect to one another is provided. The communication device may include a wireless cellular transceiver and may be configured to transmit at least one data object from the computing device to the cloud-based service and receive at least one data object from the cloud-based service. Transmitting the at least one data object from the computing device to the cloud-based service may include receiving at least one data object from the computing device, modifying at least one data object array of one or more data objects stored in memory of the communication device based upon, at least in part, the received at least one data object, and asynchronously, with respect to the computing device, transmitting, via the wireless cellular transceiver, at least a portion of the modified at least one data object array to the cloud-based service. Receiving the at least one data object from the cloud-based service may include asynchronously, with respect to the computing device, receiving, via the wireless cellular transceiver, at least a portion of the at least one data object array from the cloud-based service, modifying one or more data objects of the at least one data object array stored in the memory of the computing device based upon, at least in part, the received at least a portion of the at least one data object array, and asynchronously, with respect to the communication device's communications with the cloud-based service, making the one or more modified data objects of the at least one data object array available to the computing device.

One or more of the following example features may be included. The computing device may be a microcontroller. The computing device may be configured to be communicatively coupled to the communication device via a serial link. The at least one data object may be a JavaScript Object Notation (JSON) object.

In yet another example implementation, a communication device may be configured to be communicatively coupled to a computing device via a serial link and the computing device may be configured to communicate requests and responses with the communication device using one or more JavaScript Notation Objects (JSON) objects communicated via the serial link.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 7 is an example diagrammatic view of a management tool associated with a communication hub according to one or more example implementations of the disclosure;

FIGS. 9-10 are example diagrammatic views of a management tool associated with a communication hub according to one or more example implementations of the disclosure.

Like reference symbols in the various drawings indicate like elements.

DETAILED DESCRIPTION

Figure 1:
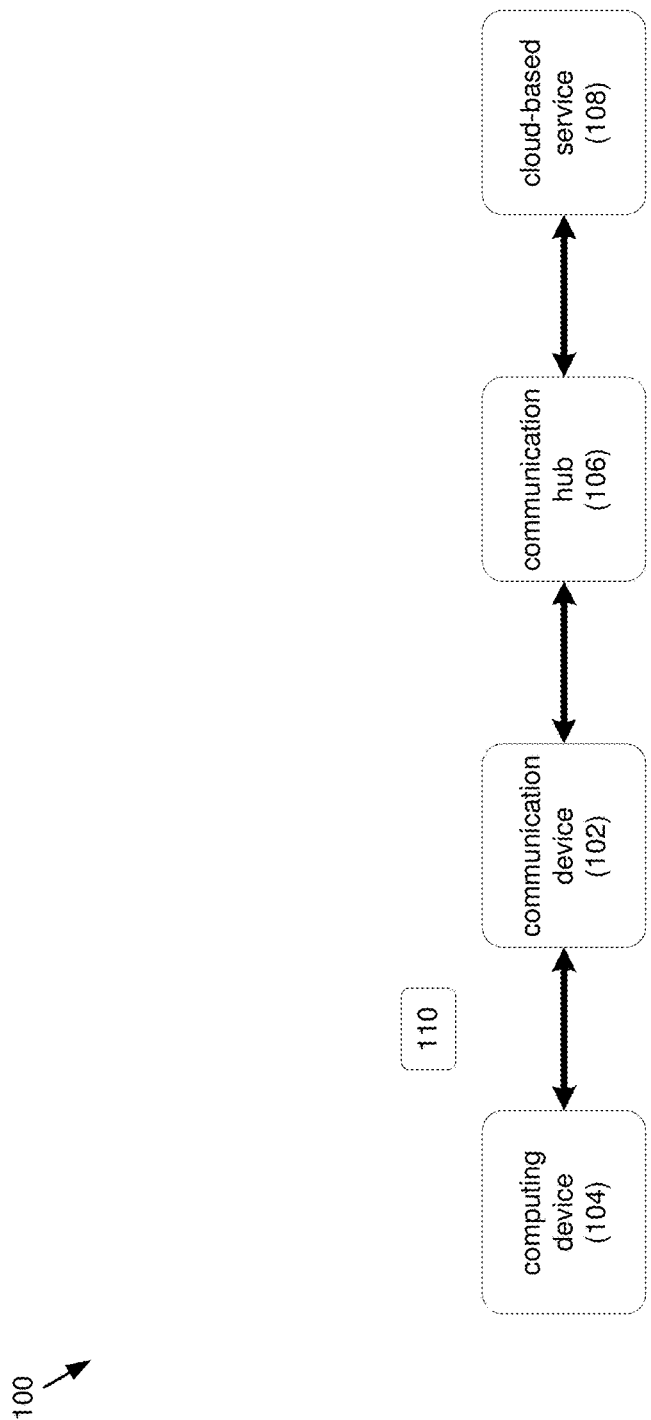
FIG. 1 is an example diagrammatic view of a communication system according to one or more example implementations of the disclosure.

As discussed above, there are currently two distinct system architectures for cellular communications, both being widely espoused. And both are dauntingly complex. For example, the cellular communications industry perspective is dominated by two core assumptions. First, that global interoperability is of prime importance—more important than speed—and that regulations and standards committees are the way that technologies shall be defined. Second, that customers will use whatever they produce—the industry and government will design and build, that industry will forever use the metered cellular business model, and that customers will come. There is zero participation of customers in defining technology or its requirements, and there is zero connection to developers.

The computing/IT industry perspective on communications is generally dominated by two core assumptions: First, that innovators and builders and industry are the way that technologies should be defined. Developers know best, and architectures should be defined forward-thinking for powerful high-end platforms and not focus so much on less-capable platforms of the past. Second, that there are a world of different devices and protocols and networks, and it is the primary job of the dominant platform providers to create generalized abstractions that will support any device, and any application, and will treat all networks as pipes that expose sockets that deliver streams. For example, there is no attention paid to 64 kbps cellular as a transport and no attention paid to 64 KB microcontrollers at the edge.

Neither of these industries wholly embraces the fact that with regard to cellular-centric massive Internet-of-things (IoT)—billions of devices—neither perspective is acceptable. The low-level nature, and the standards-based constraints of AT commands and modem modules, and custom-negotiated cellular contracts, may be too complex and may not scale. Additionally, the complex nature of certificate management and high-level Linux/Windows-based Application Programmable Interfaces (APIs) required to connect to the cloud are simply not realistic for embedded developers trying to do extremely simple things on extremely underpowered inexpensive microcontrollers.

As will be discussed in greater detail below, embodiments of the present disclosure may include a data system on a module (DSoM), data system in a package (DSiP) or communication device and/or a communication hub configured for communicatively coupling a microcontroller with a cloud-based service. As will be described in greater detail below, embodiments of the present disclosure may provide one or more of the following features: a Data System-On-Module (DSoM) with a modem/wireless cellular transceiver, prepaid cellular module, storage, IP & TLS stacks, secure element & keys/cert, GPS & accelerometer, providing connectivity without the hassle of dealing with SSIDs, passwords, access points, gateways, carriers, or SIMs; security without any provisioning challenges, with hardware crypto/keys and encrypted "off the internet" communications; battery-powered (µA) cellular without the complexity of managing modems, connections, queues, or storage; an extremely thin Infrastructure as a Service (IaaS) that directly routes data to where it belongs (e.g., Amazon Web Services (AWS™) Azure™, Google Cloud Storage™, or a custom cloud); and low barriers at all skill levels with few moving parts. (AWS is a trademark of Amazon.com, Inc. in the United States, other countries or both; Azure is a registered trademark of Microsoft Corporation in the United States, other countries or both; and Google Cloud Storage is a registered trademark of Google LLC in the United States, other countries or both). In this manner and as will be discussed in greater detail below, embodiments of the present disclosure may provide a distributed replicated spatiotemporal database packaged on a secure communication module and integrated with an Internet-based communication hub.

Referring to the example of FIG. 1 and in some embodiments, a communication system (e.g. communication system 100) may generally include a communication device (e.g., communication device 102) configured to be communicatively coupled to a computing device (e.g., computing device 104) and a communication hub (e.g., communication hub 106) configured to be communicatively coupled to a cloud-based service (e.g., cloud-based service 108). As will be discussed in greater detail below, an application may be written on a computing device (e.g., computing device 104), the data (e.g., data object 110) from the computing device (e.g., computing device 104) may be formatted for communication with a communication device (e.g., communication device 102) and transmitted to/from a communication hub (e.g., communication hub 106). The communication hub (e.g., communication hub 106) may communicate the data to/from a cloud-based service (e.g., cloud-based service 108) or application. In some embodiments, power and storage management, provisioning and security and software updates, management of wireless bands and carriers, regulatory certification, the business model, etc. for configuring a computing device (e.g., microcontroller) to communicate with a cloud-based service may all be managed by the communication device and the communication hub.

In some embodiments, a communication device may communicatively couple a computing device with a cloud-based service. In some embodiments, the computing device may include a microcontroller. A microcontroller or "MCU" may generally include a computing device on a single integrated circuit that runs a product's application logic. The MCU may run "bare" with a vendor's software development kit (SDK) or with a minimal operating environment (e.g., FreeRTOS, the Arm® Mbed™ IoT Device Platform, etc.). (Arm is a registered trademark of Arm Holdings in the United States, other countries or both). In some embodiments, even though MCUs may share many aspects of their hardware design with higher-end components (e.g., single board computers), a MCU may not run Linux® (e.g., any operating system based on the Linux kernel). (Linux is a registered trademark of Linus Torvalds in the United States, other countries or both). As is known in the art, a MCU may generally include one or more CPU cores, a memory (e.g., RAM), input/output peripherals, etc.

In some embodiments, the computing device may include a single board computer or "SBC". An SBC may generally include a Linux-based (or any OS that requires a memory management unit (MMU), such as Microsoft® Windows® or Android™) computer. (Microsoft and Windows are registered trademarks of Microsoft Corporation in the United States, other countries or both). However, it will be appreciated that other operating systems may be used by and/or installed on an SBC including, but not limited to, Microsoft® Windows®; Mac® OS X®; Red Hat® Linux®, Windows® Mobile, Chrome OS, Blackberry OS, Fire OS, or a custom operating system. (Mac and OS X are registered trademarks of Apple Inc. in the United States, other countries or both; Red Hat is a registered trademark of Red Hat Corporation in the United States, other countries or both).

A cloud-based service may generally include any service or application made available to users on demand via the Internet from a cloud computing provider's servers as opposed to being provided from an entity's own on-premises servers (e.g., a customer's server). Examples of cloud services may generally include online data storage and backup solutions, Web-based e-mail services, hosted office suites and document collaboration services, database processing, managed technical support services, etc. It will be appreciated that any cloud-based service may be used within the scope of the present disclosure.

In some embodiments, the communication device may be communicatively coupled to the computing device. As discussed above and in some embodiments, the computing device may be a microcontroller. In some embodiments, the communication device may be a Data System-On-Module (DSoM) or Data System in a Package (DSip). As is known in the art, a DSoM may generally include a board-level circuit that integrates a system function in a single module and a DSiP may generally include a number of integrated circuits enclosed in a single chip carrier package. In some embodiments, the communication device may be configured to asynchronously stage and manage secure communications of data packets (e.g., data objects) between a customer's computing device and cloud-based services, over cellular, in a power-efficient manner.

In some embodiments, the communication device may not be an application processor as it may not host customer application code. In some embodiments, the communication device may be an intelligent peripheral that is focused on two core tasks: 1) bidirectional asynchronous secure data communications of data objects; and 2) power management of peripherals.

In one example, the communication device may be packaged using a compact industry-standard M.2 3030 (NGFF) Key E form factor (30 mm square), designed to be embedded in a broad variety of situations. In some embodiments, the M.2 form factor may have an embedded SIM (eSIM), with an integrated SIM switch, enabling the hardware designer to utilize a software-selectable external SIM if they so desire. In some embodiments, the communication device may include one or more processors. For example, the communication device's request processor (e.g., STM32L4S5) may interface with circuitry in the range of e.g., 1.7-3.6V, and the socket may supply power to that processor independently of the main supply voltage, in order to suit a variety of design needs. While an example form factor and processor have been described above with a particular range of operating voltages, it will be appreciated that other form factors, processors, and voltage operating ranges may be used within the scope of the present disclosure.

In some embodiments and as will be described in greater detail below, functionality of the communication device may be implemented using one or more processors of the communication device.

In some embodiments, the main supply voltage of the communication device may be referred to as "V+" and may be used for a wireless cellular transceiver (e.g., a Quectel BG96 modem and associated circuitry). While an example wireless cellular transceiver has been discussed, it will be appreciated that the use of other wireless cellular transceivers and/or modems is possible within the scope of the present disclosure. In some embodiments, on-board regulators of the communication device may be configure for direct connection to e.g., a LiPo battery and any voltage in the range of e.g., 2.5-5.5V may be provided. However, it will be appreciated that other power sources (e.g., non-battery power sources, other types of batteries, solar powered sources, etc.) with different voltage ranges may be used within the scope of the present disclosure.

Figure 2:
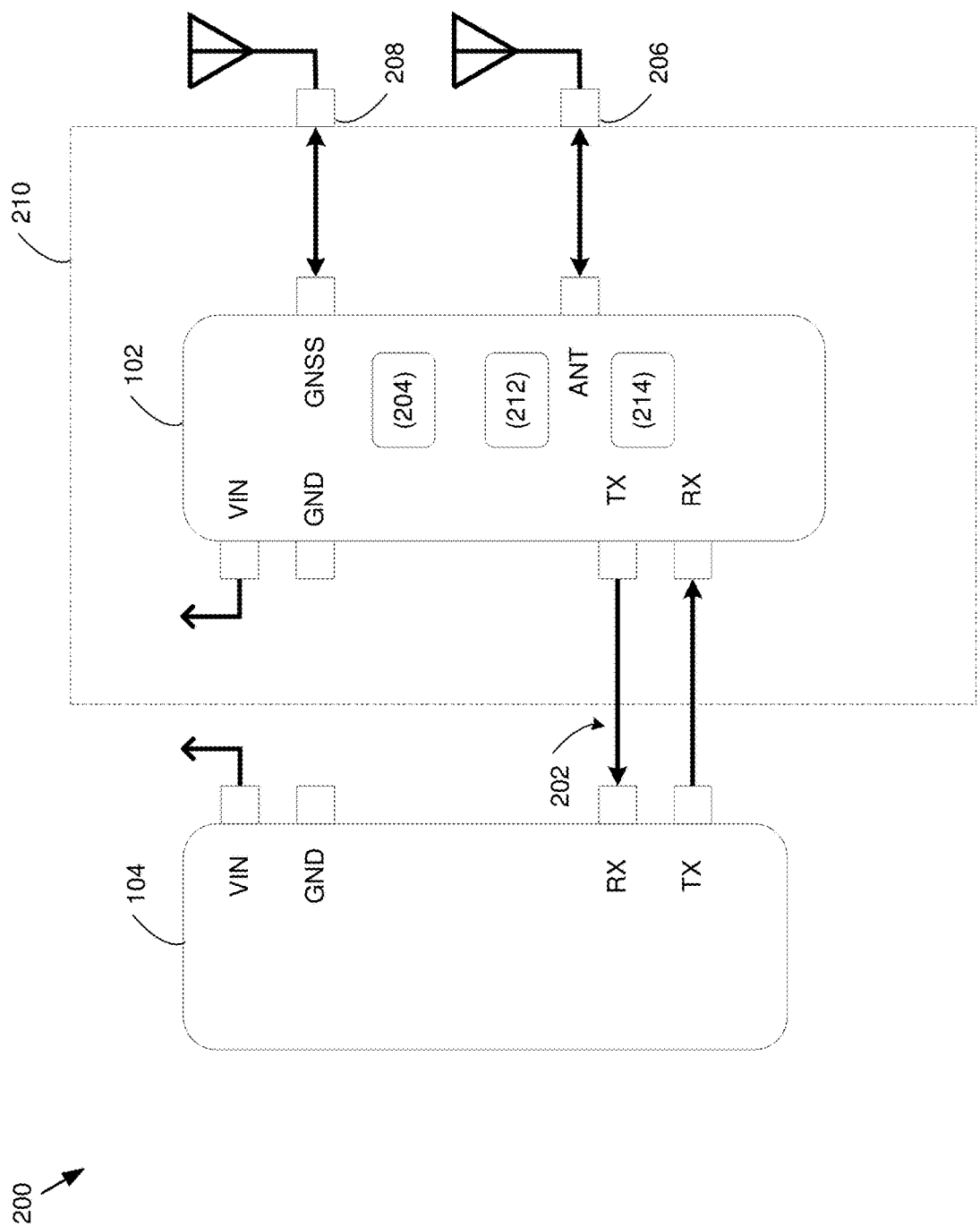
FIGS. 2-4 are example diagrammatic views of a communication device communicatively coupled to a computing device and a wireless cellular transceiver according to one or more example implementations of the disclosure.

Referring also to the example of FIG. 2 and in some embodiments, the communication device may be configured to be communicatively coupled to the computing device via a serial link. In this manner, communication device 102 may be coupled to computing device 104 with two wires. For example, the computing device (e.g., MCU) may have the option of sending requests to the communication device using a serial link (e.g., serial link 202). In some embodiments, the serial link (e.g., serial link 202) may be one or more of Universal Asynchronous Receiver/Transmitter (UART), Universal Serial Bus (USB), Inter-Integrated Circuit (I²C), Serial Peripheral Interface (SPI), MODBUS®, Controller Area Network (CAN) bus, Peripheral Component Interconnect Express (PCIe), or any other serial link/protocol. In some embodiments, the serial port of the communication device (e.g., communication device 102) may be request/response as driven by the computing device (e.g., computing device 104). In some embodiments, communication device 102 may be communicatively coupled to computing device 104 by configuring communication device 102 to act as an I²C slave device. As is known in the art, I²C is a standard bidirectional interface with a controller configured to communicate with slave devices. In some embodiments, I²C may provide an extremely low power interface for communicating between computing device 104 and communication device 102.

In one example, a USB connector may be added as a UART-alternative and may permit the communication device to be used with Linux® hosts. In some embodiments, a serial link baud rate may be fixed or variable. In one example, the baud rate may be fixed to achieve extremely low power consumption by using an internal low power UART that operates at a fixed baud rate (e.g., 9600 bps). While an example of 9600 bps has been provided, it will be appreciated that any baud rate may be used within the scope of the present disclosure.

In some embodiments, communication device 102 may support a primary serial link that has a fixed baud rate and a secondary or auxiliary serial link that has automatic baud rate detection. In some embodiments, this interface or link may be enabled by setting an "AUX WAKE" pin of the communication device 102 high. However, it will be appreciated that enabling the secondary serial link may be achieved in various ways (e.g., pushing a button, setting one or more pins high or low, etc.). In some embodiments of communication device 102 with a USB interface, data may be transferred between communication device 102 and computing device 104 using the D+/D− wires.

In some embodiments, the communication device may include a wireless cellular transceiver. In some embodiments, the wireless cellular transceiver (e.g., wireless cellular transceiver 204) may be module of communication device 102. A wireless cellular transceiver may generally include any wireless cellular transceiver for wireless, wide area telecommunications. Examples may include, but are not limited to, LTE-M, LTE Cat M1, Narrowband Internet of Things (NB-IoT), LTE Cat NB1, 3G, 2G, etc. As known in the art, LTE-M and NB-IoT are types of low power wide area network (LPWAN) radio technology standards developed by 3GPP to enable a wide range of cellular devices and services (specifically, for machine-to-machine and Internet of Things applications). While specific example cellular and radio technology standards have been provided, it will be appreciated that any cellular communication standard may be used within the scope of the present disclosure.

In some embodiments, wireless cellular transceiver 204 may be configured to be communicatively coupled with a wireless cellular transceiver antenna (e.g., antenna 206) and/or antenna array configured for wireless cellular communications. In some embodiments, wireless cellular transceiver antenna 206 may include one or more omnidirectional and/or directional antennas.

In some embodiments, communication device 102 may be coupled to a carrier board (e.g., carrier board 210). A carrier board may generally include a circuit configured to interface a communication device (e.g., communication device 102) with other computing devices (e.g., computing device 104). In some embodiments, carrier board 210 may enable rapid integration of a communication device for a specific user. For example, some carrier boards (e.g., carrier board 210) may be focused on exposing functions at e.g., 3.3V logic via header pins for rapid breadboard prototyping. Other carrier boards (e.g., carrier board 210) may have integral omnidirectional LTE antennas (e.g., antenna 206) and global navigation satellite system (GNSS) antennas (e.g., antenna 208), pre-certified by the carrier, with a flat back and castellated connections so that the carrier board may be soldered to a motherboard in an industrial or high-volume manufacturing setting. For example, one carrier board (e.g., carrier board 210) may not include a built in wireless cellular transceiver antenna 206 and/or GNSS antenna 208. In another example, a carrier board (e.g., carrier board 210) may include a wireless cellular transceiver antenna and/or a GNSS antenna. It will be appreciated that various carrier boards may be used within the scope of the present disclosure for different configurations.

In some embodiments, the carrier board (e.g., carrier board 210) may include a microUSB connector configured for providing power to the communication device and for relaying data objects to the cloud-based service. For example, by simply plugging this USB connector into another computing device, such as the Raspberry Pi™, a user can type commands into any serial terminal program.

(Raspberry Pi is a registered trademark of Raspberry Pi Foundation in the United States, other countries or both).

In some embodiments, the carrier board (e.g., carrier board 210) may include a microswitch configured to provide varying voltages. For example, a microswitch may enable both 3.3V and 1.8V operation. While example voltages have been provided, it will be appreciated that any voltages may be used within the scope of the present disclosure.

Figure 3:
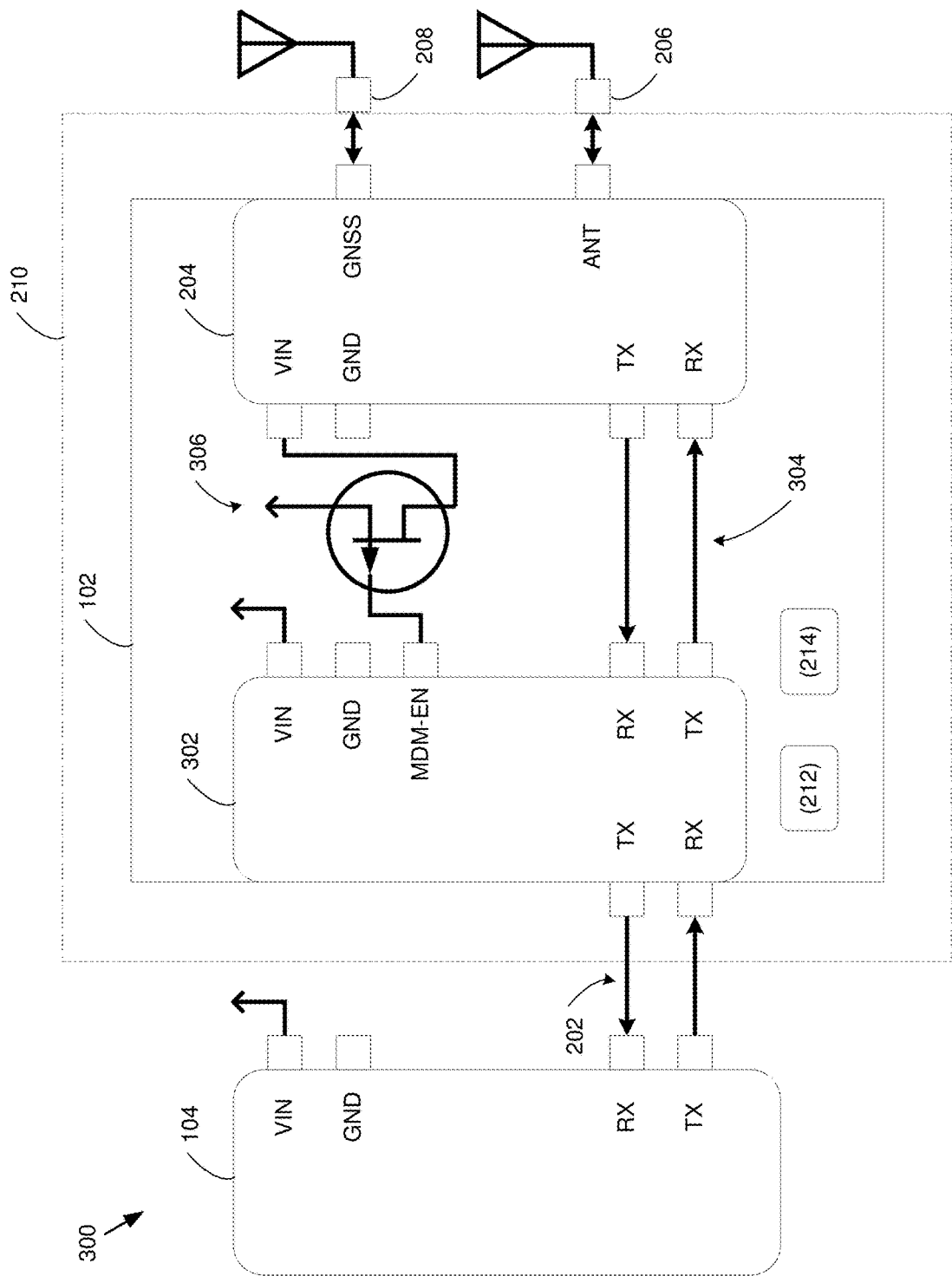

Referring again to the example of FIG. 3 and in some embodiments, communication device 102 may include one or more processors (e.g., processor 302) communicatively coupled to a wireless cellular transceiver and/or wireless cellular modem (e.g., wireless cellular transceiver 204). While processor 302 is shown as being separate from wireless cellular transceiver 204 in FIG. 3, in some embodiments, processor 302 may be an integrated processor of wireless cellular transceiver 204. Alternatively, processor 302 may be physically separate from wireless transceiver 204. For example and in some embodiments, processor 302 may be configured to be communicatively coupled to the wireless cellular transceiver 204 via a serial link 304. In some embodiments, wireless cellular transceiver 204 may be exclusively "owned" and controlled by communication device 102. For example and as discussed above, power consumption of communication device 102 may be dependent upon, at least in part, the duty cycle and on-air behaviors of wireless cellular transceiver 204. For example, although the current draw may be typically in the 0-250 mA range when wireless cellular transceiver is active, for a few milliseconds, the current draw may spike to up to nearly e.g., 2A when in a region requiring the use of GSM. As such, the voltage input or "VIN" of communication device 102 may be directly connected to a battery or other supply that is capable of such brief spikes.

In some embodiments, communication device may be configured to enable and disable the power of its wireless cellular transceiver. In one example where communication device 102 includes a processor separate from the wireless communication device, as shown in FIG. 3, communication device 102 may include power control circuitry (e.g., power control circuitry 306) coupled to one or more pins (e.g., a "MDM-EN" pin) configured to selectively enable and/or disable the power input (e.g., "VIN" pin) of wireless cellular transceiver 204. In this manner, communication device 102 may control wireless cellular transceiver/modem power to perform duty cycle management.

Figure 4:
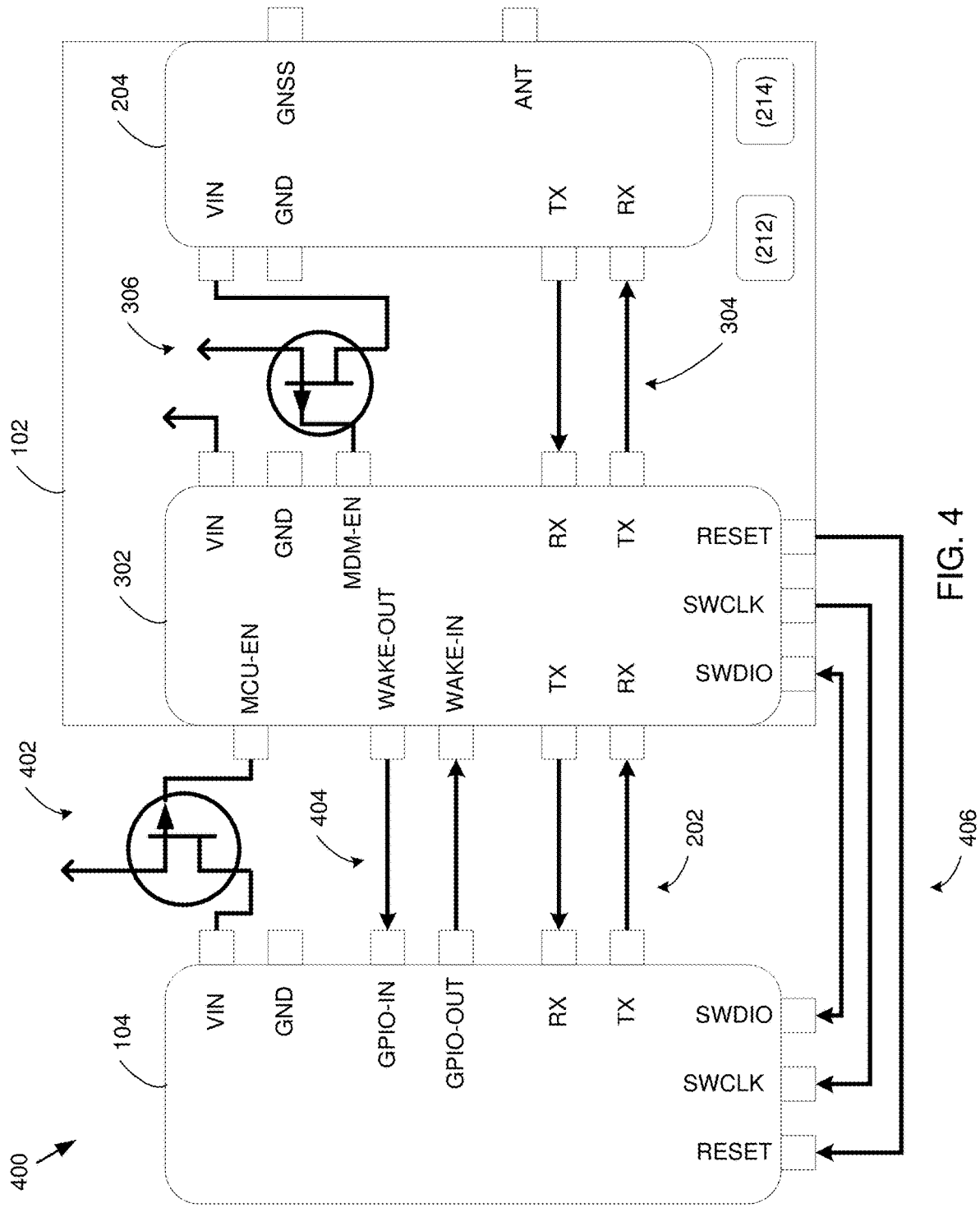

In some embodiments, the communication device may be configured to enable and/or disable the power of the computing device. As shown in the example of FIG. 4 and in some embodiments, communication device 102 may include power control circuitry 402 coupled to one or more pins (e.g., a "MCU-EN" pin) configured to selectively enable the power input (e.g., "VIN" pin) of computing device 104. For example, software scheduling capabilities of the communication device may permit control of the computing device's duty cycle. In some embodiments, the computing device and the communication device may be configured to enter "deep sleep" modes without the need for periodic polling through link 404 between computing device 104 and communication device 102. For example, computing device 104 may be provided a software option to denote specific data object arrays for tracking and one or more pins (e.g., a "WAKE-OUT" pin) of communication device 102 may be asserted when incoming tracked data is received from a cloud-based service and is available for the computing device to process. The data object arrays may be user-defined and/or defined automatically (e.g., by a default setting). This configuration may allow significant power savings by only waking computing device 104 when data is received from a cloud-based service.

In some embodiments, communication device 102 may normally wait in a sleep state for timers and/or a command from computing device 104 coming across serial link 202. In some embodiments, computing device 104 may assert one or more pins (e.g., a "WAKE-IN" pin) when computing device 104 knows it will not be issuing any commands to the communication device 102. In this configuration, serial link 202 may be disabled to save additional power.

In some embodiments, the communication device may be configured to receive at least one data object from the computing device. A data object may generally include a data packet configured for conveying information to and from a computing device. In some embodiments, and as will be discussed in greater detail below, computing device 104 may provide communication session data objects that do not contain data for a cloud-based service but may be used for configuring a connection between communication device 102 and cloud-based service 108. Referring again to the example of FIG. 1 and in some embodiments, computing device 104 may transmit (e.g., via serial link 202) at least one data object to communication device 102. In some embodiments, computing device 104 may include one or more sensors and/or controls configured to generate data to be stored in a cloud-based service.

In some embodiments, the at least one data object may be a JavaScript Object Notation (JSON) object. As is known in the art, JSON is an open-standard file format that uses human-readable text to transmit data objects consisting of attribute-value pairs and array data types (or any other serializable value). In some embodiments, JSON objects may include one or more JSON requests and/or one or more JSON responses. As will be discussed in greater detail below, the data generated by the computing device may be transmitted as a JSON request including a data object to the communication device for storage in a cloud-based service. For example, computing device 104 may be configured to encapsulate data as a combination of an optional payload and an optional body with one or more attributes (e.g., the time the data object was created, the location where it was created, the computing device that created the data object, etc.). A payload may generally include a e.g., base64-encoded JSON string containing arbitrary application data (e.g., "payload": "YWJHhLW0tLW0tLW0tLW0tLGt5eg=="). A body may generally include a JSON object containing arbitrary application/cloud-based service data (e.g., "body":{"temp":34.2, "alert":true,"particle":{"mass":[5.1,12.32],"count"]}}).

While the examples above include JSON objects, it will be appreciated that other data object formats are possible and within the scope of the present disclosure.

In some embodiments, communication device 102 may be configured to provide a data object to a cloud-based service with two or more JSON requests. In one example, a data object may be provided to a cloud-based service with only two JSON requests. For example, when computing device 104 starts up, it may send communication device 102 a JSON request over its serial port (e.g., via serial link 202) to configure 1) an identifier for this computing device, so that the cloud-based service knows which computing device is providing data; and 2) the maximum time that data should be allowed to stay on the communication device before it is sent to the cloud-based service in a batch with other staged data. An example of these JSON data objects or commands that may be received are shown below with an example computing device configured to monitor e.g., air humidity:

setup( )
serial.println {"req":"service.set","product":"com.acme.airmon","minutes":60}
loop( )
serial.println {"req":"note.add","file":"air.qo","body": {"temp":72,"humid":61}}

As shown above, the "loop( )" command, without further setup, may allow the computing device to issue a simple JSON command to add a JSON data object to a collection of like-data (e.g., a data object array) stored in the communication device. In this example the ".qo" in "air.qo" may mean "outbound queue" and "air" may be a user-defined name. As shown in the example above and in some embodiments, the data object's "body" may be completely freeform JSON that may be interpreted by the cloud-based service without schema constraints. While the above example discusses the receiving of data objects from the computing device when the computing device starts, it will be appreciated that data objects may be received from the computing device at any point in the operation of the computing device.

In some embodiments, data objects may be configured to provide information regarding the computing device, the communication device, the communication hub, and/or the cloud-based service. For example, data objects may be configured to request and return service-configured environmental variables, return current service configuration parameters, display whether a communication device is connected, disconnected, or in an intermediate state, manually initialize synchronization of data objects, display information about the last synchronization, transmit "live" messages to or from a service administrator, etc.

Figure 5:
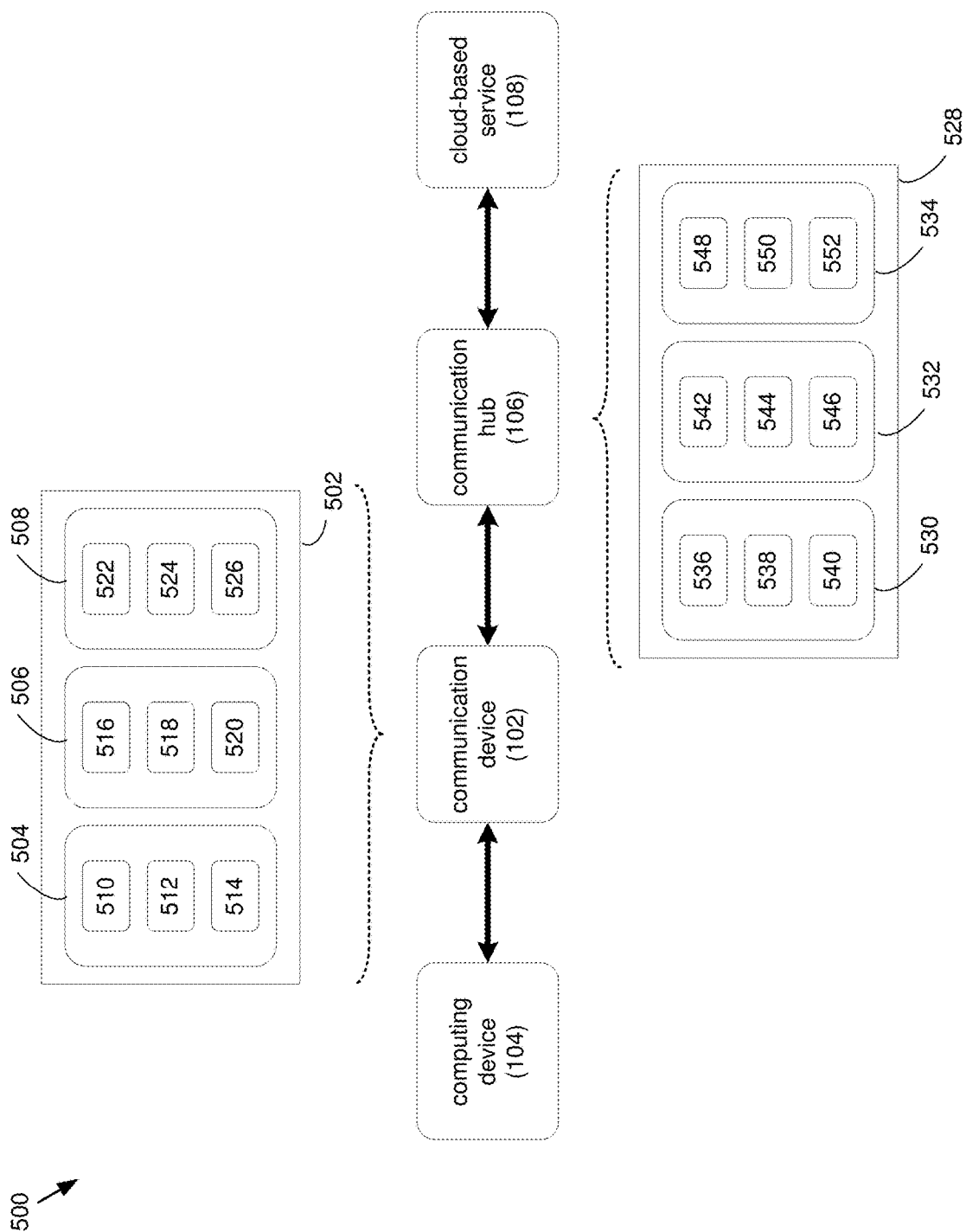
FIG. 5 is an example diagrammatic view of a communication system with one or more data object arrays according to one or more example implementations of the disclosure.

Referring also to the example of FIG. 5 and in some embodiments, the communication device may be configured to modify at least one data object array of one or more data objects stored in memory of the communication device based upon, at least in part, the received at least one data object. A data object array may generally include a persistent file containing an array of data objects automatically created when a first data object is added. Accordingly and in some embodiments, data object arrays may be created as data objects are received by communication device 102. In some embodiments, data object arrays may be assigned names. These names may be arbitrary and/or may be associated with the generation of the data objects of the data object array (e.g., data objects associated with a particular sensor, etc.). As shown in FIG. 5, a set of data object arrays (e.g., set of data object arrays 502) may be stored within the memory of communication device 102. In some embodiments, the set of data object arrays may include at least one data object array (e.g., data object arrays 504, 506, 508). In some embodiments, each of the at least one data object arrays may include one or more data objects (e.g., data objects 510, 512, 514, 516, 518, 520, 522, 524, 526). As will be discussed in greater detail below, communication hub 106 may similarly include a set of data object arrays (e.g., data object array 528) including at least one data object array (e.g., data object array 530, 532, 534). In this example, data object array 530 may include data objects 436, 438, 540; data object array 532 may include data objects 542, 544, 546; and data object array 534 may include data objects 548, 550, 552.

In some embodiments, a data object array (e.g., data object 110) may include a data object extension that determines certain attributes of the data object. For example, one data object extension (e.g., ".db") may indicate that the data object is a database object that may be fully replicated between a cloud-based service and a communication device. In some embodiments, the database extension may be commonly used for maintaining configuration and status information. In another example, a data object extension (e.g., ".qo") may indicate that the data object is an outbound-only data object that is only being sent from communication device 102 to communication hub 106. Once these data objects are transferred to communication hub 106, they may be deleted from the data object array within communication device 102. In another example, a data object extension (e.g., ".qi") may indicate that the data object is an inbound-only data object that is only being sent from communication hub 106 to communication device 102. Once these data objects are transferred to communication device 102, they may be deleted from the data object array within communication hub 106. While several example data object extensions have been described above, it will be appreciated that other data object extensions are possible within the scope of the present disclosure.

In some embodiments, secure variants of the data object extensions (e.g., ".dbs", ".qos", ".qis") may indicate that the data objects are to be encrypted. In some embodiments, data objects may generally be transmitted without encryption as a way of reducing bandwidth. However, for data objects that are more sensitive, these secure data object extensions may ensure that the data objects are transferred on a TLS-encrypted communication session.

Referring again to the example of FIG. 5 and in some embodiments, data object array 504 may include data objects (e.g., data objects 510, 512, 514) and may be associated with a bi-directional extension. Data object array 506 may include data objects (e.g., data objects 516, 518, 520) and may be associated with an outbound-only extension. In this example, data object array 506 may be an outbound-only queue configured to transmit data objects 516, 518, 520 to communication hub 506 and delete the data objects from data object array 506. In some embodiments, data object array 508 may be associated with data objects (e.g., data objects 522, 524, 526) with an inbound-only extension. In this example, data object array 508 may be configured to receive data objects 522, 524, 526 that were transmitted from communication hub 106 and deleted from a data object array of communication hub 106. In this manner, communication device 102 may be a Data System in a Package (DSiP) with a distributed replicated spatiotemporal database which may be integrated with internet-based secure communication hub 106. While an example has been provided of three data object arrays associated with particular data object extensions, it will be appreciated that any number of data object arrays may be used within the scope of the present disclosure and/or that data object arrays need not be limited to data object extensions. For example, data object arrays may be defined for various computing device sensors, types of data objects, etc.

In some embodiments, modifying the at least one data object array may include one or more of adding, deleting, and changing a data object of the data object array. For example, if a data object is a new data object, modifying the at least one data object array may include adding the new data object to the data object array. If data object includes deleting an existing data object, modifying the at least one data object array may include deleting the data object from the data object array. If a data object in a data object array is updated or changed, modifying the at least one data object array may include updating or changing the data object.

In some embodiments, data objects may be added to or updated within at least one data object array stored in memory of the communication device with additional metadata. For example, when data objects are received from computing device 104 using the e.g., "note.add" request, the data object may be automatically augmented with e.g., time and location information, if available from the communication device's hardware. Similarly, when data objects are received that update or change an existing data object, the data object may be automatically augmented with e.g., time and location information, if available from the communication device's hardware. It will be appreciated that other metadata may be added to data objects within the scope of the present disclosure.

In some embodiments, the communication device may be configured to asynchronously, with respect to the computing device, transmit, via the wireless cellular transceiver, at least a portion of the modified at least one data object array to the cloud-based service. As used herein, "asynchronously, with respect to the computing device, transmitting" may include transmitting data independently from or of the computing device and without involvement of the computing device. As discussed above, the transmitting of the at least a portion of the at least one data object array from communication device 102 may be asynchronous with respect to computing device 104. In some embodiments, asynchronous transmission of data objects by communication device 102 may allow computing device 104 to be offline or "asleep" when communication device transmits data objects.

For example, suppose that computing device 104 is configured to provide data objects (e.g., air temperature and humidity readings) to cloud-based service 108 at a pre-defined frequency (e.g., every hour). Computing device 104 may provide data objects to communication device 102 at the pre-defined frequency. However, communication device 102 may be configured to transmit data objects (e.g., in the form of modifications to a data object array) to communication hub 106 asynchronously with respect to computing device 104. As stated above, the transmitting by communication device 102 may be independent from or of computing device 104 and without involvement of computing device 104. In this example, communication device 102 may transmit the data objects at different pre-defined frequency (e.g., once per day). In this manner, computing device 104 may provide data objects (e.g., modification to data objects of a data object array) at its pre-defined frequency without managing or controlling communication device 102. In this manner and in some embodiments, computing device 104 may be able to easily provide data to communication device 104 and communication device 102 may transmit the data to cloud-based service 108 independently of computing device 104. As will be discussed in greater detail below, this asynchronous transmitting of data objects by communication device 104 may allow communication device 102 to provide data objects while conserving power of communication device 102 and/or computing device 104 and/or without requiring the involvement of computing device 104.

In some embodiments, the communication device may be configured to receive a communication policy from the computing device. A communication policy may generally one or more communication session criteria for the communication device including one or more of conserving power, conserving network bandwidth, securing data objects, and prioritizing some data objects with respect to other data objects. For example, suppose a user wishes to prioritize the conservation of power of the computing device and/or communication device for a longer operating life. In this example, the communication policy may define how often communication device 104 transmits or receives data objects. As will be discussed in greater detail below, this may impact how often wireless cellular transceiver 204 is powered (e.g., by communication device 102) and/or how often a GNSS or GPS antenna is powered (e.g., by communication device 102). In another example, suppose a user wishes to prioritize the security of data object communication. In this example and as will be discussed in greater detail below, the communication policy may define when a data object is compressed and/or encrypted using a security element of communication 102. In another example, suppose a user wishes to tag data objects with metadata including the location of communication device 102 (e.g., in the example of a communication device with a changing location). In this example and as will be discussed in greater detail below, the communication policy may define when data objects are tagged with metadata including the location of communication device 102 at a particular time. While three examples of communication priorities have been discussed, it will be appreciated that other priorities are possible and within the scope of the present disclosure (e.g., an amount of data communicated, providing certain data from certain sensors, etc.).

In some embodiments, at least one data object received from computing device 102 may define the communication policy. For example and in some embodiments, a data object may include a request configured to set communication device cellular connections as shown in the example request below:

---

{"req";"service.set"
 "product":RegisteredProductID"
 "mode":
  "periodic" is a default mode which may periodically connect to
  the communication hub,
  "continuous" may be for high-power devices with always-on
  cellular with data synchronizing periodically,
  "minimum" disables periodic connections, requiring another
  command (e.g., "service.sync") when a sync is needed.
 "minutes":maxWaittoSyncOutboundData such as newly added data
 objects may be queued,
 "hours":maxWaittoSyncInboundData such as environment variables
 from the cloud-based service,
 "align":true to align syncs onto a regular time-periodic cycle v. being
 "maxWait" triggered
}

---

In some embodiments, the communication device may be configured to generate a schedule for transmitting, via the wireless cellular transceiver, the at least a portion of the data object array to the cloud-based service and/or for receiving, via the wireless cellular transceiver, the at least a portion of the data object from the cloud-based service, based upon, at least in part, the communication policy received from the computing device. For example, communication device 102, using its own heuristics, may schedule connections to communication hub 106 at which point it bi-directionally synchronizes data objects as deemed necessary. As will be discussed in greater detail below, the data objects may be moved and/or replicated from data object array staging areas between the communication device storage and the communication hub storage.

In one example, communication device 102 may manage a schedule that determines when and how often to establish communications with a cellular network as cellular communications via wireless cellular transceiver 204 may require relatively large amounts of power. In this example, the communication policy may prioritize conserving power and communication device 102 may manage the schedule to determine when and how often to transmit and/or receive data objects/modifications to data object arrays.

Figure 6:
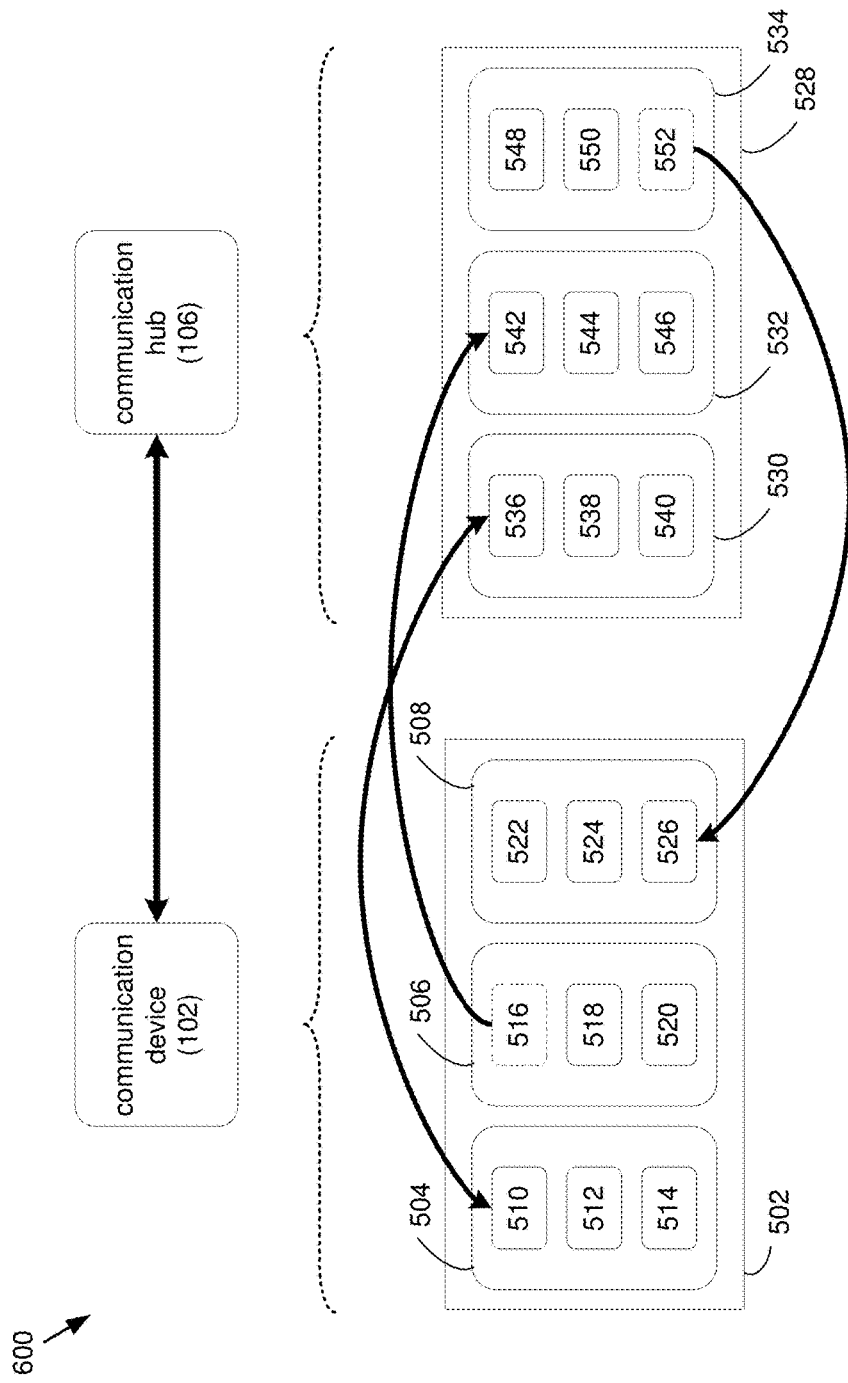
FIG. 6 is an example diagrammatic view of data objects of data object arrays being synchronized between a communication device and a communication hub to define a distributed replicated spatiotemporal database according to one or more example implementations of the disclosure.

Referring also to the example of FIG. 6 and in some embodiments, communication device 102 may be configured to asynchronously, with respect to computing device 104, transmit, via wireless cellular transceiver 204, one or more data objects to communication hub 106. As discussed above, communication hub 106 may similarly include a set of data object arrays (e.g., data object array 528) including at least one data object array (e.g., data object array 530, 532, 534). In this example, data object array 530 may include data objects 536, 538, 540; data object array 532 may include data objects 542, 544, 546; and data object array 534 may include data objects 548, 550, 552. While three data object arrays have been discussed, it will be appreciated that any number of data object arrays may be stored within communication hub 106 within the scope of the present disclosure.

In some embodiments, communication device 102 may include data object array 504 and data object array 506 with data object 510 and data object 516, respectively that may be asynchronously, with respect to computing device 104, transmitted to communication hub 106. In this example, data object 510 may be a bi-directionally replicated data object such that data object 510 is replicated in data object array 530 as data object 536. Additionally, data object 516 may be an outbound-only data object such that when data object 516 is transmitted to data object array 532 of communication hub 106, data object 516 may be stored in data object array 532 as data object 542 and data object 516 may be deleted from data object array 506 (e.g., as indicated by dashed lines around data object 516). While an example of two data objects being transmitted to communication hub 106 has been described, it will be appreciated that any number of data objects and/or data object arrays (e.g., portions of and/or entire data object arrays) may be transmitted to communication hub 106 within the scope of the present disclosure.

In some embodiments, the communication device may be configured to asynchronously, with respect to the computing device, receive, via the wireless cellular transceiver, at least a portion of the at least one data object array from the cloud-based service. As used herein, "asynchronously, with respect to the computing device, receiving" may include receiving data independently from or of the computing device and without involvement of the computing device. For example, suppose that communication hub 106 is configured to provide weather data at a pre-defined frequency (e.g., every hour). As will be discussed in greater detail below, communication hub 106 may transmit or provide data objects to communication device 102 (e.g., wireless cellular transceiver 204) at the pre-defined frequency. However, communication device 102 may be configured to receive the data objects from communication hub 106 asynchronously with respect to computing device 104. As stated above, the receiving of data objects by communication device 102 may be independent from or of computing device 104 and without involvement of computing device 104. In this example, computing device 104 may receive the data objects from communication device 102 at different pre-defined frequency (e.g., once per day). In this manner, computing device 104 may receive data objects at its pre-defined frequency without managing or controlling communication device 102.

In some embodiments, computing device 104 may be able to receive data from communication device 104 and communication device 102 may receive data from cloud-based service 108 independently of computing device 104. As will be discussed in greater detail below, this asynchronous receiving of data objects/modifications to a data object array by communication device 104 may allow communication device 102 to receive data objects while conserving power of communication device 102 and/or computing device 104 and/or without requiring the involvement of computing device 104. In some embodiments, asynchronous receiving of data objects by communication device 102 may allow computing device 104 to be offline or "asleep" when communication device receives data objects. As discussed above, communication device 102 may provide a signal to computing device 104 to "wake up" computing device 104 so that computing device 104 may request the data from communication device 102 when data is received. In this manner, computing device 104 may not be involved in the receiving of data objects by communication device 102.

In some embodiments, communication device 102 may modify one or more data objects of the at least one data object array stored in the memory of the computing device based upon, at least in part, the received at least a portion of the at least one data object array. In some embodiments, modifying the at least one data object array may include one or more of adding, deleting, and changing a data object of the data object array. For example, if a data object is a new data object, modifying the at least one data object array may include adding the new data object to the data object array. If data object includes deleting an existing data object, modifying the at least one data object array may include deleting the data object from the data object array. If a data object in a data object array is updated or changed, modifying the at least one data object array may include updating or changing the data object.

As discussed above and in some embodiments, data objects may be communicated bi-directionally between a cloud-based service and a computing device. In some embodiments, wireless cellular transceiver 204 may receive one or more data objects from communication hub 106 and may communicate the one or more received data objects to communication device 102 via serial link 304. As discussed above and in some embodiments, the communication device may be configured to modify the one or more data objects of the at least one data object array stored in the memory of the computing device based upon, at least in part, the received at least a portion of the at least one data object array. Referring also to the example of FIG. 6 and in some embodiments, communication hub 106 may include data object array 534 with data object 552 that may be transmitted to communication device 102. As discussed above, communication device 102 may be a Data System in a Package (DSiP) with a distributed replicated spatiotemporal database which may be integrated with internet-based secure communication hub 106. In this example, data object 552 may be an inbound-only data object such that when data object 552 is transmitted to data object array 508 of communication device 102, data object 552 may be stored in data object array 508 as data object 526 and data object 552 may be deleted from data object array 534 (e.g., as indicated by dashed lines around data object 552). While an example of one data object being transmitted to communication hub 106 has been described, it will be appreciated that any number of data objects and/or data object arrays (e.g., portions of and/or entire data object arrays) may be received by communication device 102 within the scope of the present disclosure.

In some embodiments, the communication device may be configured to asynchronously, with respect to the communication device's communication with the cloud-based service, make the one or more modified data objects of the at least one data object array available to the computing device. As used herein, "asynchronously, with respect to the communication device's communication with the cloud-based service, making the one or more modified data objects of the at least one data object array available to the computing device" may include making data objects received from the cloud-based service (e.g., modified data objects based on received portion of at least one data object array) available to the computing device independently from or of the communication device's communication with the cloud-based service. Referring again to the example of FIG. 2 and in some embodiments, communication device 102 may make at least a portion of at least one data object array available to computing device 104 by staging the at least a portion of the at least one data object array on communications device 102 (e.g., in memory of communication device 102 as discussed above) and receiving a request by computing device 104 for the at least a portion of the at least one data object array. In this manner, computing device 104 may request (via serial link 202) the at least a portion of the at least one data object array. Accordingly, communication device 104 may make the modified data objects available to computing device 102 independent of any communication with cloud-based service 108.

Referring again to the example of FIG. 4 and in some embodiments, the communication device may be configured to receive, via the wireless cellular transceiver, firmware data in the form of the one or more data objects for storage in the memory of the communication device. In some embodiments, computing device 104 may receive firmware updates via communication device 102. For example and as shown in FIG. 4, assume for example purposes only, that computing device 104 includes a two-wire Serial Wire Debug (SWD) interface (e.g., SWD interface 306). In some embodiments, SWD interface 406 may allow, among other things, a re-flash of a computing device (e.g., microcontroller) firmware. In this example, a developer may choose to store persistent firmware data (e.g., configuration data) in the communication device's memory (e.g., flash memory) rather than in the computing device's memory. By doing so, an authorized developer may cause new firmware to be received, via wireless cellular transceiver 204, and downloaded to communication device 102. In some embodiments, other firmware data or firmware images (e.g., "last known good firmware") may be downloaded to the communication device.

Continuing with this example, communication device 102 may receive one or more commands from the computing device to transmit at least a portion of the received firmware data to the computing device (e.g., via SWD interface 406) for installing the received firmware data on the computing device. In some embodiments, communication device 102 may completely re-flash computing device 104's firmware. While FIG. 4 shows an example with SWD pins on a computing device, it will be appreciated that other configurations may be used to re-flash the firmware of computing device 104. For example and in some embodiments, re-flashing firmware may be performed by holding one or more pins low on computing device 104 (e.g., a GPIO-00 pin (not shown)) during booting of computing device 104 via one or more pins of communication device 102 (e.g., a "RESET" pin). Firmware may then be transmitted to computing device 104 using serial link 202.

In some embodiments, the communication device may include a global navigation satellite system (GNSS) system and may be configured to be communicatively coupled to a GNSS antenna. As is known in the art, a GNSS receiver (GNSS receiver 212) may generally include an electronic device or module that receives and digitally processes the signals from a GNSS satellite constellation in order to provide position, velocity and time (of the receiver). In some embodiments, data objects transferred by communication device 102 may be tagged with time and location metadata. In some embodiments, location information may be obtained using a GNSS receiver, while time may be available from both the cellular network and GNSS receiver. In some embodiments, communication device 102 may include an accelerometer (accelerometer 214) configured to sample the GNSS antenna when the accelerometer detects movement. In some embodiments, and so that energy use can be optimized for communication devices not in-motion, communication device 102 may have a MEMS-based accelerometer (e.g., accelerometer 214) to determine when use of the GNSS antenna is not required. In this manner, the GNSS antenna (e.g., GNSS antenna 208) may be enabled when a movement is detected by the accelerometer (e.g., accelerometer 214) and otherwise disabled to conserve power.

In some embodiments, the communication device may be configured to add metadata to the one or more data objects, the metadata including one or more of time and a location of the communication device. For example, communication device 102 may be configured to tag data objects with metadata. The metadata may include a time and/or a location of the communication device as determined using GNSS antenna 208. In some embodiments, computing device 102 may tag data objects with time information metadata when the data object is received (e.g., from computing device 104 or communication hub 106).

In some embodiments, one of the communication device edge pins may allow the designer to supply a bias voltage to the GPS's/GNSS's receiver u.fl connector, as required by any active GNSS/GPS antenna. For convenience, a 3.8V supply may be provided by communication device 102 that can be used for that purpose. In some embodiments, if a GNSS antenna (e.g., GNSS antenna 208) is communicatively coupled to communication device 102, an Active/Passive switch may enable a user to choose which type of antenna is being coupled to communication device 102. If Active, 3.8V may be provided as bias voltage to power the antenna's integrated LNA. While specific voltage values have been discussed above, it will be appreciated that any voltage required for a GNSS antenna may be provided within the scope of the present disclosure.

In some embodiments, at fabrication, non-volatile memory of the communication device is configured to include one or more security keys and a digitally-signed certificate enabling secure authentication of the communication device and communication with the cloud-based service. For example and as discussed above, modern cloud-based services may require that the cloud and communication device 102 perform bidirectional authentication so that neither can be spoofed. Furthermore, for many applications, it may be important that over-the-air and over-the-wire data is encrypted. For this reason and in some embodiments, communication device 102 may integrate e.g., an STSAFE-A100 Secure Element which may include symmetric keys that are generated within the chip at point of chip manufacture or fabrication. Because of this, neither the manufacturer of communication device 102 nor the manufacturer of computing device 104 has any need to handle or manage secure key material. In one example, the security keys generated for communication device 102 may use elliptic-curve cryptography (ECC) with the NIST P-384 curve, and the signature algorithm may be ECDSA-with-SHA384. While specific examples of a secure element and particular signature algorithms have been provided, it will be appreciated that any security device or module configured to generate encryption keys and/or any signature algorithm may be used to secure data between cloud-based service 108 and communication device 102 within the scope of the present disclosure.

In some embodiments, the communication device may be configured to one or more of compress and encrypt the data object based upon, at least in part, the communication policy received from the computing device and the metadata added to the one or more data objects. For example and as discussed above, encrypting data objects may require significant power from communication device 102. In this manner, communication device 102 may utilize data object metadata and/or a communication policy to determine whether or not data objects are compressed and/or encrypted. While an example of compressing and/or encrypting data based on a power conservation has been discussed, it will be appreciated that the metadata and communication policy may determine when the compress and/or encrypt data objects in other circumstances as well (e.g., based on location, time, security prioritization, etc.).

In some embodiments, communication device 102 may have power controls and may make heavy use of variable clock speeds. As discussed above, the wireless cellular transceiver (e.g., wireless cellular transceiver 204) and/or modem may draw significant current when transmitting or receiving, the GNSS when receiving, the CPU when doing session or data object encryption, and even the Secure Element may draw constant power when enabled to prevent certain side-channel attacks. However and in some embodiments, no single switch in the communication device design may have a quiescent current greater than one micro amp (e.g., Iq>1 µA). That is, the quiescent current of each switch of communication device 102 may be less than one micro amp. However, it will be appreciated that any quiescent current is possible within the scope of the present disclosure. When coupled with its ability to run one or more serial links (e.g., I²C, UART, USB, etc.) and real-time clock (RTC) when the processor is in e.g., a "STOP" mode, communication device 102 may draw less than e.g., 8 µA at e.g., 3.3V when idle. Accordingly, communication device 102 may provide a low power, cellular tether solution for microcontrollers and other computing devices.

Referring again to the example of FIG. 1 and in some embodiments, a communication hub may be configured to be communicatively coupled to one or more communication devices and a cloud-based service. As will be discussed in greater detail below and in some embodiments, communication hub 106 may be configured to provide a very thin layer of functionality: first, to auto-provision and enable customers to aggregate communication devices (e.g., communication device 102) of similar function into communication device groups (e.g., "Fleets") whose operations can then be monitored; and second, to configure such fleets with "Routes" by which data objects (e.g., JSON-formatted data) arriving from communication devices (e.g., communication device 102) may be forwarded to a cloud-based service (e.g., cloud-based service 108).

As discussed below, wireless cellular transceiver 204 may be configured to transmit data across cellular networks. For example and as discussed above, wireless cellular transceiver 204 may be configured to transmit and receive data using various communication protocols (e.g., 2G, LTE Cat-M, LTE Cat-NB1, etc.) where data is transmitted to and from a cellular tower and/or cellular node (e.g., eNodeB). As is known in the art, cellular nodes or towers may be communicatively coupled to a backhaul or other network to relay data to a particular destination. Accordingly, wireless cellular transceiver 204 may be configured to transmit data across cellular networks to communication hub 106.

In some embodiments, communication hub (e.g., communication hub 106) may generally include a software service configured to organize one or more communication devices (e.g., communication device 102) into one or more communication device groups. The communication hub may also associate one or more routes with the one or more communication device groups, where the one or more routes may be configured to route one or more data objects between the one or more communication devices communicatively coupled to the one or more computing devices and the cloud-based service and may asynchronously, with respect to the one or more computing devices, route the one or more data objects between the one or more communication devices and the cloud-based service via the one or more routes. In some embodiments and as will be discussed in greater detail below, communication hub 106 may be deployed as a single-instance hyper scale Software-as-a-Service (SaaS) service or as a customer's own private communication hub service instance deployed on a server.

In some embodiments, the communication hub (e.g., communication hub 106) may be configured to manage one or more communication devices, where the one or more communication devices are communicatively coupled to one or more computing devices. In some embodiments, each communication device of the one or more communication devices may have a unique identifier. In some embodiments, the unique identifier may be automatically assigned for each communication device (e.g., communication device 102) and/or may be manually assigned or configured for each communication device.

In some embodiments, communication hub 106 may associate one or more communication device product identifiers with one or more communication hub projects. A communication hub project may generally include a customer-specific entity that includes one or more communication devices, communication device groups, and routes associated with or assigned to the one or more communication device groups that define how data objects from a communication device (e.g., communication device 102) are transferred by communication hub 106. Referring also to the example management tool (e.g., management tool 700) of FIG. 7 and in some embodiments, a user may create a project (e.g., assigning the project a name, creating one or more accounts, etc.). A user may then create one or more communication device product identifiers that communication hub 106 will associate with a communication hub project. For example, a user may provide one or more communication device product identifiers (e.g., "product.org.safecast.*"; "product.org.safecast.ninja"; "product.org.safecast.air"; etc.). In some embodiments, the use of an asterisk symbol "*" may include any communication device product identifier including the portion of the product identifier before the "*" symbol. For example, by creating the communication device product identifier "product.org.safecast.*", any communication device product identifier that includes "product.org.safecast." will be associated with this project. While an asterisk symbol has been described as an example symbol to designate open-ended communication device product identifiers, it will be appreciated that other symbols may be used within the scope of the present disclosure.

In some embodiments, communication hub 106 may receive one or more incoming communication sessions from the one or more communication devices, wherein each incoming communication session includes the one or more communication device's product identifier. For example, suppose communication device 102 transmits an incoming communication session (e.g., via a JSON object) to cloud-based storage 108 as shown in the example below:
setup( )
serial.println {"req":"service.set","product":"org.safecast.air","minutes":60}

In this example, communication hub 106 may identify a communication device product identifier (e.g., "org.safecast.air") from the incoming communication session. In some embodiments, communication hub 106 may associate communication device 102 with a particular communication hub project because of the communication device product identifier associated with the project. However, it will be appreciated that other communication device product identifiers may be identified from data objects within the scope of the present disclosure.

In some embodiments, communication hub 106 may provision the one or more communication devices for communication with the one or more communication device groups and routes to cloud-based services based upon, at least in part, the product identifier of the communication session established with the one or more communication devices. In some embodiments, provisioning the one or more communication devices for communication with the communication hub itself and one or more cloud-based services may include associating the one or more communication devices with one or more communication device groups. For example, communication hub 106 may organize or assign communication device 102 into a communication device group (e.g., a user-defined, default communication device group for the communication hub project). As will be discussed in greater detail below, communication hub 106 may automatically associate the one or more communication devices with one or more routes between the one or more communication devices, the communication hub, and one or more cloud-based services.

Figure 8:
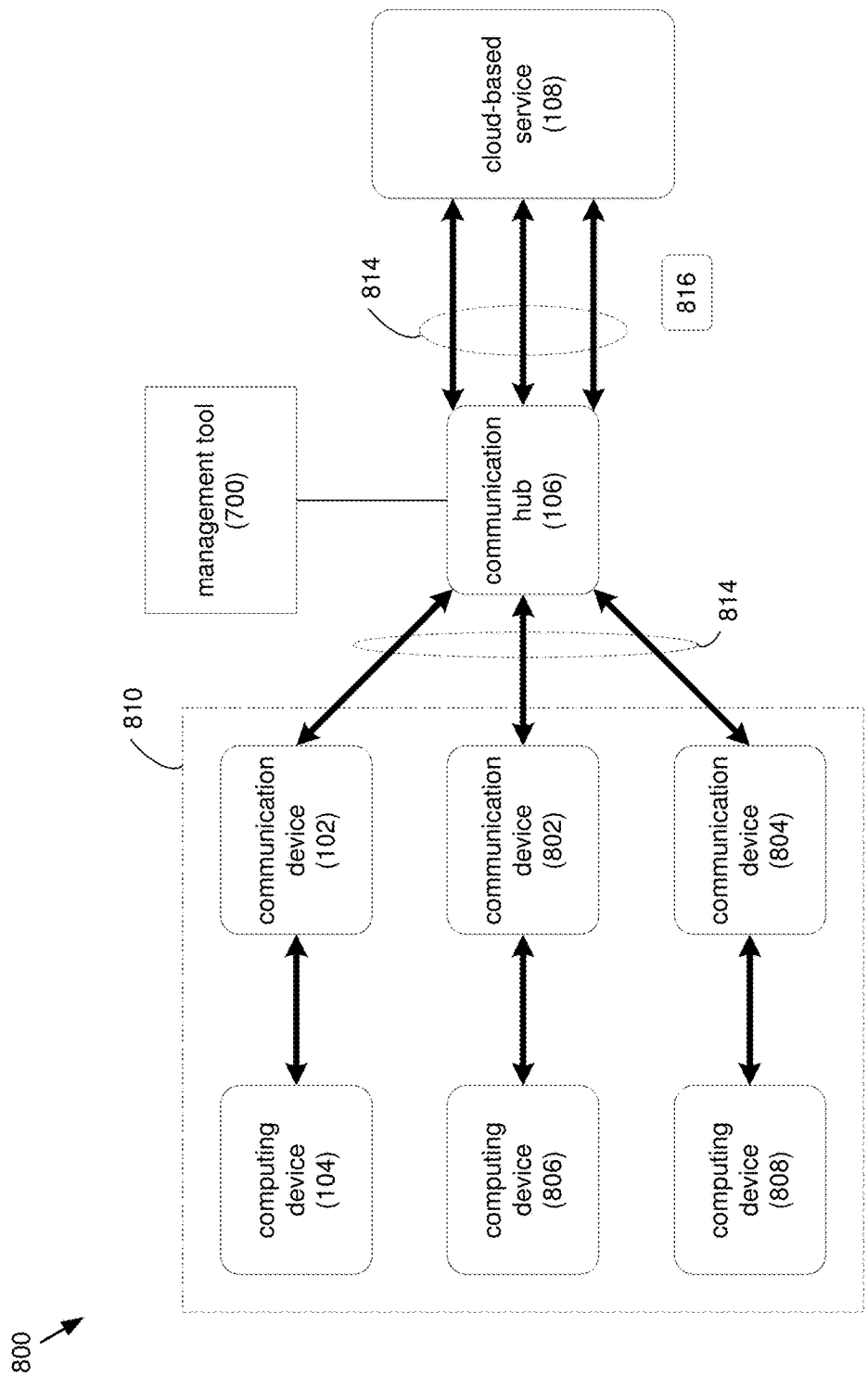
FIG. 8 is an example diagrammatic view of a communication system with one or more data object arrays according to one or more example implementations of the disclosure.

In some embodiments, communication hub 106 may organize the one or more communication devices into one or more communication device groups. Referring also to the example of FIG. 8 and in some embodiments, one or more communication devices (e.g., communication devices 102, 802, 804) communicatively coupled to one or more computing devices (e.g., computing devices 104, 806, 808) may be organized into one or more communication device groups (e.g., communication device group 810). In some embodiments, the one or more communication device groups may be user-defined and/or may be automatically organized by communication hub 106.

Figure 9:
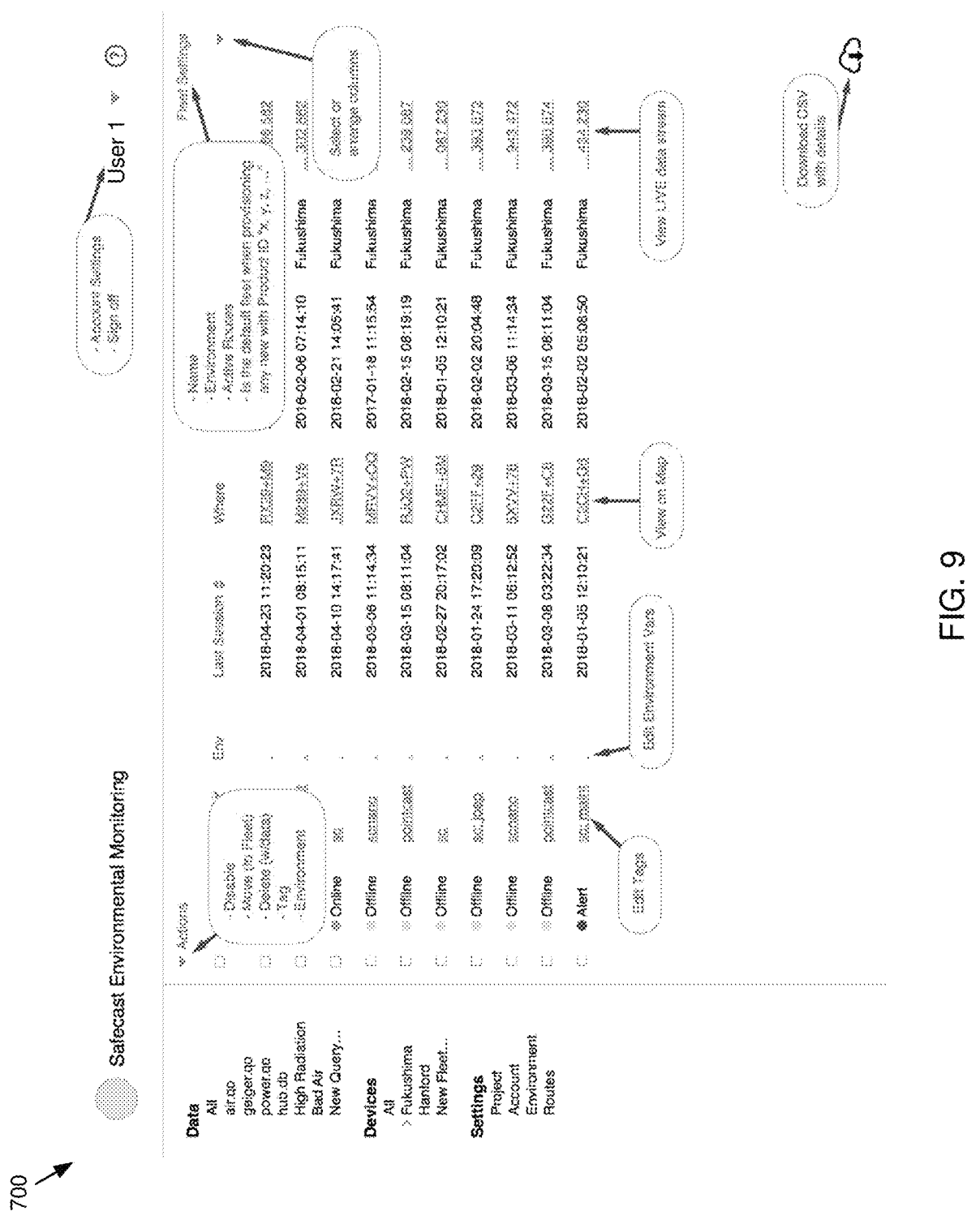
Figure 10:
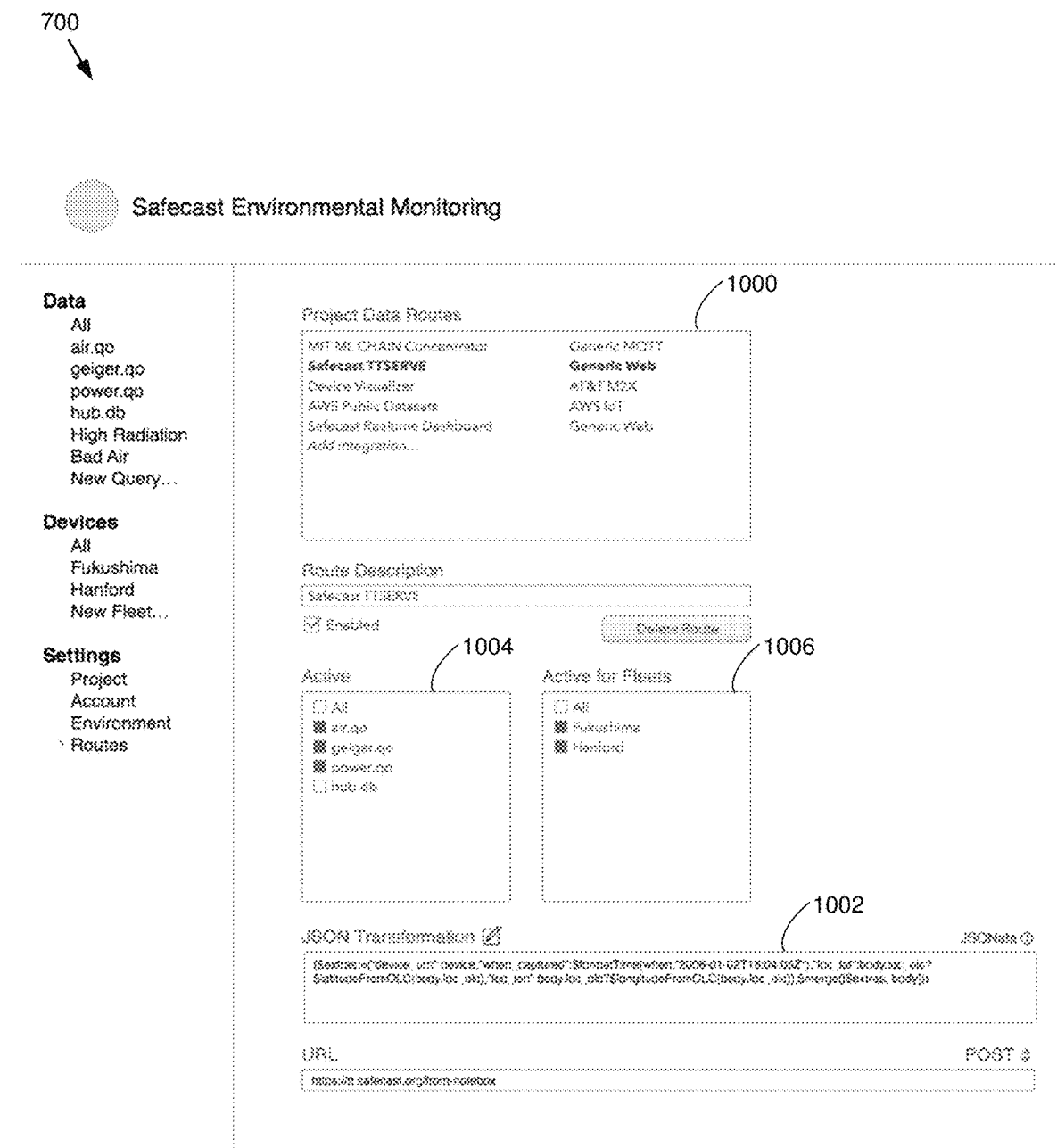

Referring also to the example of FIGS. 9-10 and in some embodiments, managing the one or more communication devices may include providing a management tool (e.g., a graphical user interface) configured to allow a user to manage the one or more communication device groups and the one or more routes. For example, a management tool (e.g., management tool 700) may be provided to a user for managing one or more communication device groups and routes associated with the one or more communication device groups.

In some embodiments, the communication hub (e.g., communication hub 106) may be configured to route one or more data objects between the one or more communication devices communicatively coupled to the one or more computing devices and the cloud-based service. Referring again to the example of FIG. 8 and in some embodiments, one or more routes (e.g., one or more routes 814) may include communication channels between communication devices 102, 802, 804 and communication hub 106 and between communication hub 106 and cloud-based service 108. In some embodiments, the one or more routes may enable transfer of the one or more data objects between the communication hub and the cloud-based service. In some embodiments, the routes may include one or more cloud-based service addresses, authentication information associated with the cloud-based service, JSON transformation information (as will be discussed below), user credentials for accessing the cloud-based service (e.g., a user name and password), and any other information used for allowing communication hub to route the one or more data objects/modifications to a data object array to the cloud-based service.

Referring to FIG. 10 and in some embodiments, routing the one or more data objects may include associating one or more communication device groups with one or more routes. As shown in FIG. 10, management tool 700 may be configured to allow a user to associate one or more communication device groups or "fleets" with one or more project data routes (e.g., routes 1000). In some embodiments, the one or more routes (e.g., one or more routes 814) may include one or more servers configured to transfer the one or more data objects between the communication hub and the cloud-based service.

As discussed above, communication hub 106 may generally be deployed as a Software-as-a-Service (SaaS) service or as a service instance on a customer's server. In some embodiments where a communication hub 106 is deployed as a service instance on a customer's server, the routing of the one or more data objects from the one or more communication devices and the communication hub is at least partially over an Internet connection. For example, communication device-to-communication hub communications may occur over the Internet (e.g., via HTTP APIs) when the communication hub is deployed as a service instance on the customer's server. In another example where communication hub 106 is deployed as a SaaS service, the routing of the one or more data objects from the one or more communication devices and the communication hub is at least partially over a non-Internet accessible connection. In other words, the communication device-to-communication hub communications may be logically "off the Internet". For example, the data objects may be configured to travel in a secure tunnel from a cellular carrier directly to a virtual private cloud (VPC) (e.g., via a non-Internet connection). In this manner, the routing of the one or more data objects from the one or more communication devices and the communication hub may be protected from Internet-based attack vulnerabilities as the communication devices are not IP-addressable.

Figure 11:
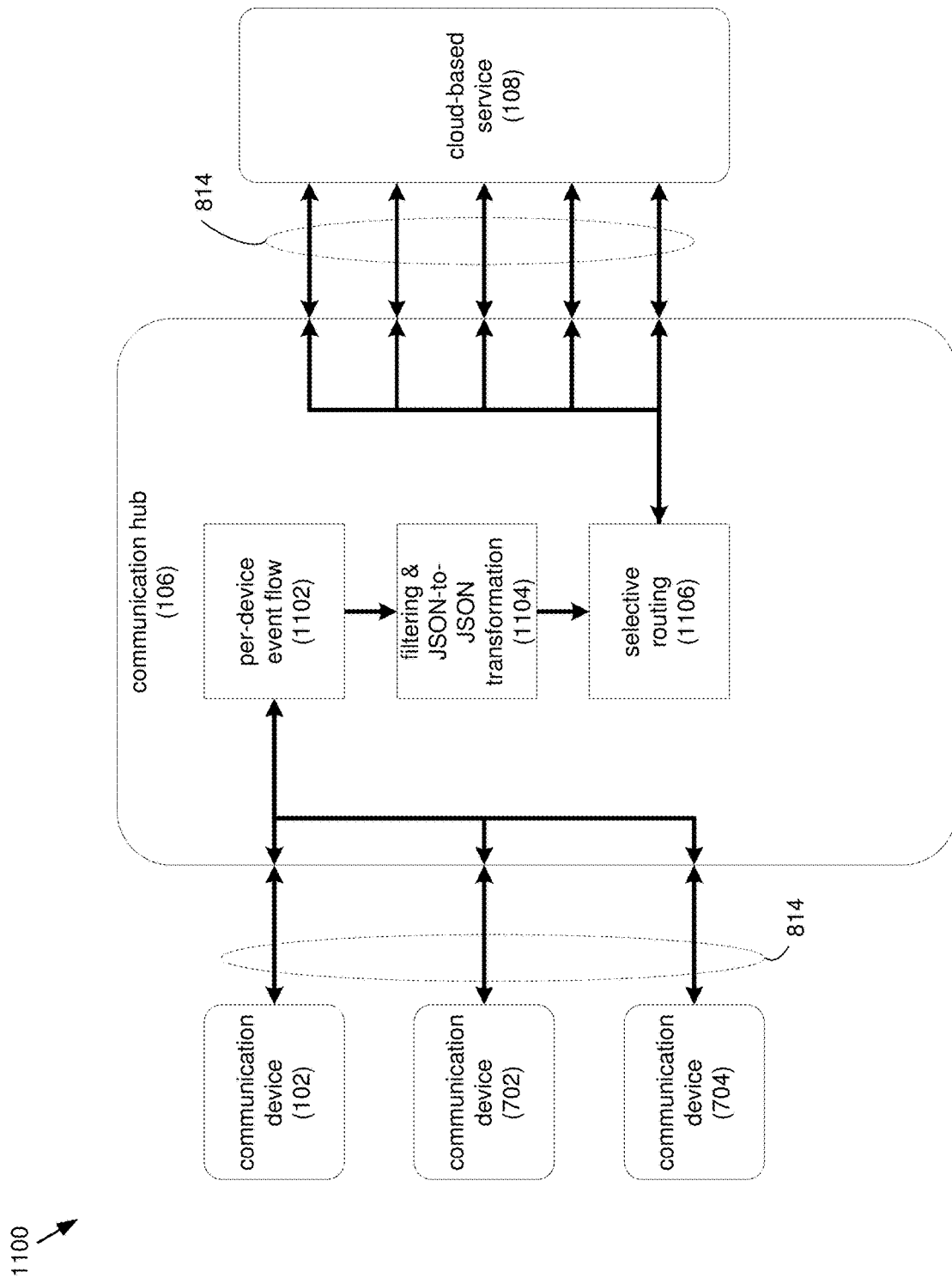
FIGS. 11-12 are diagrammatic views of a communication hub according to one or more example implementations of the disclosure.

In some embodiments and referring also to the example of FIG. 11, routing the one or more data objects may include a per-device event flow (e.g., per-device event flow 1102), filtering and data object-to-data object transformation (filtering & JSON-to-JSON transformation 1104), and selective routing (e.g., routing 1106). In some embodiments, and referring also to FIG. 12, per-device event flow 1102 may include receiving a data object from a communication device (e.g., via either an HTTP API (e.g., Internet-based communication) or a device tunnel (e.g., non-Internet based communication) as discussed above). In the example of a data object received via the device tunnel, pre-event device flow 1102 may log the data object in the temporal session log (e.g., temporal session log 1202). If the data object is received via HTTP API or device tunnel, pre-event device flow 1102 may add the data object to at least one data object array stored in communication hub 106 (e.g., data object array storage 1204). When communicating data objects from cloud-based service 108, the above-described process may be reversed. For example, a data object may be received from cloud-based service, added to at least one data object array stored in communication hub 106, and transmitted to a computing device via an HTTP API or a device tunnel.

Figure 12:
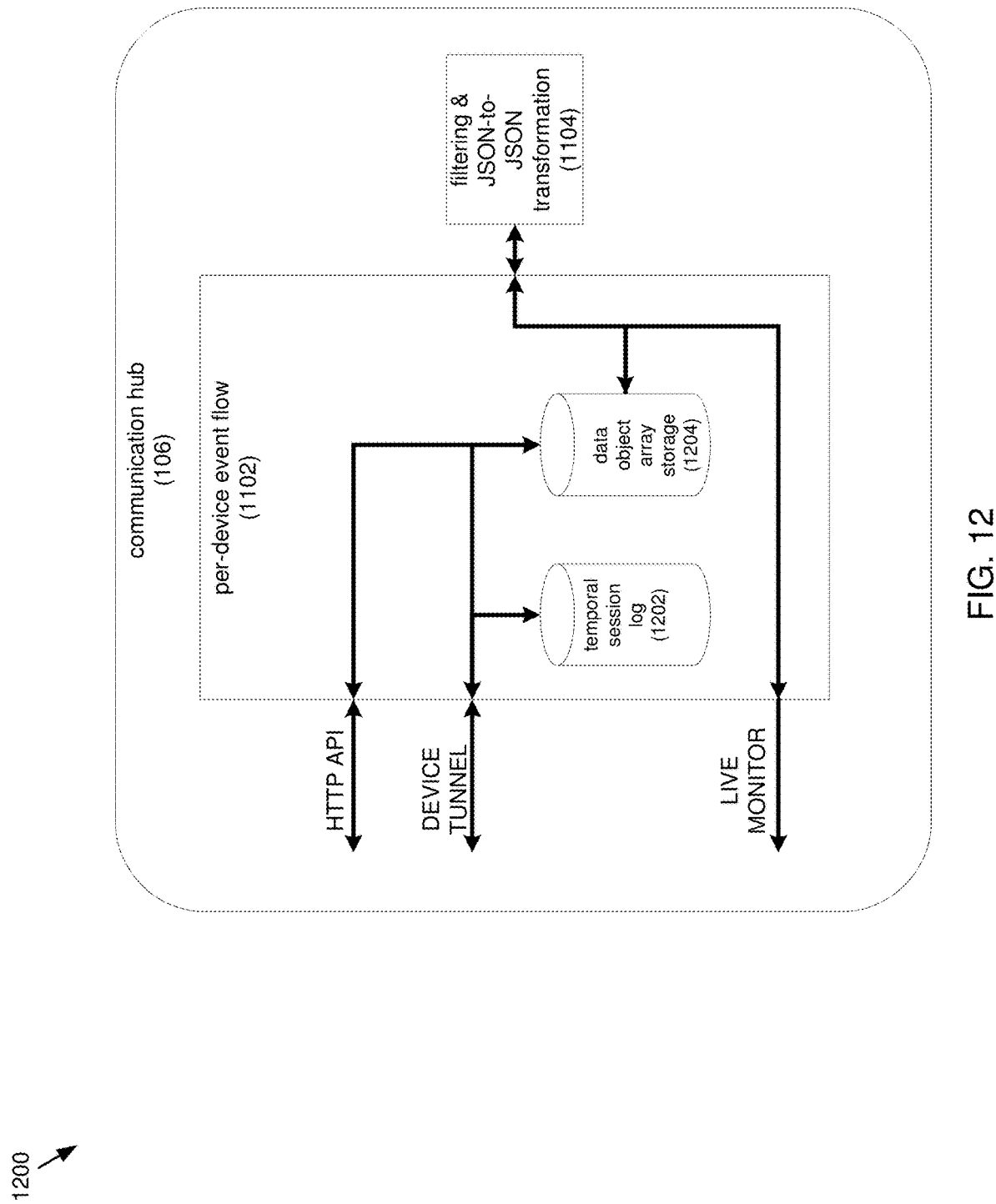

In some embodiments, routing the one or more data objects may include synchronizing at least a portion of the at least one data object array of the communication hub with at least a portion of at least one corresponding data object array of the one or more communication devices communicatively coupled to one or more computing devices. In some embodiments, "synchronizing" may generally include creating, deleting, and updating data object arrays. In some embodiments and as will be discussed in greater detail below, synchronizing may be unidirectionally up/outbound (e.g., to the cloud-based service only/not maintained in communication devices), unidirectionally down/inbound (e.g., to the communication device only/not maintained in the communication hub), or bidirectionally (e.g., maintained in both the communication devices and the communication hub) based on the data object extension of the data array. For example, and as shown in FIG. 12, when a data object is received by communication hub 106, at least a portion of at least one data array object of communication hub 106 stored in data object array storage 1204 may be synced with the received data object.

In some embodiments, synchronizing the at least a portion of the at least one data object array of the communication hub with the at least a portion of the at least one corresponding data object array of the one or more communication devices may include bi-directionally synchronizing at least a portion of the at least one data object array of the communication hub with the at least a portion of the at least one corresponding data object array of the one or more communication devices. For example and referring again to FIG. 6, data object 536 may be a bi-directionally replicated data object such that data object 536 is replicated in data object array 504 as data object 510.

In some embodiments, synchronizing the at least a portion of the at least one data object array of the communication hub with the at least a portion of the at least one corresponding data object array of the one or more communication devices may include synchronizing the at least a portion of the at least one data object array of the communication hub to the at least a portion of the at least one corresponding data object array of the one or more communication devices. In this example, synchronizing the at least a portion of the at least one data object array of the communication hub to the at least a portion of the at least one corresponding data object array of the one or more communication devices may be unidirectional. In some embodiments, in response to synchronizing the at least a portion of the at least one corresponding data object array of the one or more communication devices (e.g., adding or modifying the at least one corresponding data object array of the one or more communication devices), communication hub may be configured to delete the at least a portion of the at least one data object array of the communication hub. For example, data object 552 may be an inbound-only data object such that when data object 552 is transmitted to data object array 508 of communication hub 106, data object 552 may be stored in data object array 508 as data object 526 and data object 552 may be deleted from data object array 534 (e.g., as indicated by dashed lines around data object 534).

In some embodiments, synchronizing the at least a portion of the at least one data object array of the communication hub with the at least a portion of the at least one corresponding data object array of the one or more communication devices may include synchronizing the at least a portion of the at least one data object array of the communication hub from the at least a portion of the at least one corresponding data object array of the one or more communication devices. In some embodiments, in response to synchronizing the at least a portion of the at least one data object array of the communication hub from the at least a portion of the at least one corresponding data object array of the one or more communication devices (e.g., adding or modifying the at least one data object array of the communication hub), communication device may be configured to delete the at least a portion of the at least one corresponding data object array of the communication device. For example, communication device 102 may include data object array 506 with data object 516 that may be transmitted to communication hub 106. In this example, data object 516 may be an outbound-only data object such that when data object 516 is transmitted to data object array 532 of communication hub 106, data object 516 may be stored in data object array 532 as data object 542 and data object 516 may be deleted from data object array 506 (e.g., as indicated by dashed lines around data object 516).

In some embodiments, synchronizing of the at least a portion of the at least one data object array of the communication hub with the at least a portion of at least one corresponding data object array of the one or more communication devices is based upon, at least in part, a data object extension associated with each of the one or more data object arrays. For example, and as discussed above, data object arrays may be defined based upon, at least in part, data object extensions associated with each of the one or more data object arrays. In this manner, the data object extensions may define how data is to be moved and/or replicated between communication hub 106 and communication device 102.

In some embodiments, and as discussed above, routing the one or more data objects may include receiving the one or more data objects (e.g., JSON objects) from the one or more communication devices communicatively coupled to the one or more computing devices. In some embodiments and referring again to the example of FIG. 12, communication hub may filter and transform the one or more data objects (e.g., JSON objects). In some embodiments, a user may wish to provide transformation logic for transforming data objects (e.g., JSON objects) received from a communication device and/or for transforming data objects (e.g., JSON objects) being transmitted to a communication device. Referring again to the example of FIG. 9 and in some embodiments, management tool 700 may provide a portion of a user interface (e.g., window 1002) for allowing a user to define one or more JSON-to-JSON transformations. In this example, a user may select one or more data objects in another portion of a user interface (e.g., window 1004) such that a particular data object is transformed based on the user-defined transformation. In some embodiments, a user may select one or more communication device groups or "fleets" in another window (e.g., window 1006) such that selected data objects from window 1004 of a selected communication device group may be transformed according to the transformation provided in window 1002. While an example of various windows has been provided, it will be appreciated that the user interface may be configured in various ways to facilitate a user's selection of communication device groups, data objects, and data object transformations (e.g., JSON transformations) within the scope of the present disclosure.

In some embodiments and referring again to the example of FIG. 11, communication hub may selectively route (e.g., selective routing 1106) the one or more data objects to and from the cloud-based service. Referring again to the example of FIG. 10 and in some embodiments, one or more routes may be determined for routing the data objects between communication hub 106 and cloud-based service 108. As discussed above regarding data object transformations, particular routes may be selected or associated with particular data objects (e.g., via window 1004) and/or particular communication device groups (e.g., via window 1006).

In some embodiments, a data object may be transmitted to/from cloud-based service 108 using one or more APIs. Referring again to the example of FIG. 8 and in some embodiments, the one or more APIs (e.g., APIs 816) may be callable via HTTP or HTTPs with a downloadable key. In some embodiments, APIs 816 may include an HTTP GET or POST with the data object in the body of what is posted or what is returned. In some embodiments, the data object may be transmitted to cloud-based service 108 as a JSON object. For example, a data object or JSON object may be transmitted to cloud-based storage 108 as shown in the example below:
POST
"req":"note.add","file":"air.qo","device":"imei:8664250", "product":"com.acme.airmon",
"when":1544643332,"where":"JMC3+56","body":{"temp": 72,"humid"61}}

In this manner, the data object generated by computing device 104 may be communicated to cloud-based service 108 via the combination of computing device 102 and communication hub 106 with minimal user implementation and across cellular communications. While JSON objects have been discussed in the above example, it will be appreciated that other data objects may be conveyed via APIs 816 within the scope of the present disclosure.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A data system-on-module (DSoM) for communicatively coupling a computing device with a cloud-based service to synchronize one or more data modifications, on an asynchronous basis with respect to one another, the DSoM configured to be communicatively coupled directly to the computing device and comprising:
a wireless cellular transceiver;
wherein the DSoM is configured to one or more of:
A) transmit one or more data objects from the computing device to the cloud-based service via a cellular connection formed between the DSoM and the cloud-based service, including:
receiving at least one data object from the computing device,
modifying at least one data object array of one or more data objects stored in memory of the DSoM based upon, at least in part, the received at least one data object, and
asynchronously, with respect to the DSoM's communication with the computing device, transmitting, via the wireless cellular transceiver, at least a portion of the modified at least one data object array to the cloud-based service based upon, at least in part, a power management policy received from the computing device defining when to receive and/or transmit data objects using the DSoM; and B) receive one or more data objects from the cloud-based service via the cellular connection formed between the DSoM and the cloud-based service, including:
  asynchronously, with respect to the DSoM's communication with the computing device, receiving, via the wireless cellular transceiver, at least a portion of the at least one data object array from the cloud-based service based upon, at least in part, the power management policy received from the computing device,
  modifying the one or more data objects of the at least one data object array stored in the memory of the DSoM based upon, at least in part, the received at least a portion of the at least one data object array, and
  asynchronously, with respect to the DSoM's communication with the cloud-based service, making the one or more modified data objects of the at least one data object array available to the computing device based upon, at least in part, the power management policy received from the computing device.

2. The DSoM of claim 1, wherein the computing device is a microcontroller.

3. The DSoM of claim 1, wherein the communication device DSoM is configured to be communicatively coupled to the computing device via a serial link.

4. The DSoM of claim 3, wherein the serial link includes one or more of Universal Asynchronous Receiver/Transmitter (UART), Universal Serial Bus (USB), Inter-Integrated Circuit (I²C), Serial Peripheral Interface (SPI), MODBUS®, Controller Area Network (CAN) bus, and Peripheral Component Interconnect Express (PCIe).

5. The DSoM of claim 1, wherein the DSoM is configured to receive a communication policy from the computing device including one or more communication session criteria for the DSoM including one or more of: conserving network bandwidth, securing data objects, and prioritizing some data objects with respect to other data objects.

6. The DSoM of claim 5, wherein the DSoM is further configured to one or more of:
  generate a schedule for transmitting, via the wireless cellular transceiver, the at least a portion of the data object array to the cloud-based service, based upon, at least in part, the communication policy received from the computing device; and
  generate a schedule for receiving, via the wireless cellular transceiver, the at least a portion of the data object array from the cloud-based service, based upon, at least in part, the communication policy received from the computing device.

7. The DSoM of claim 6, wherein the communication device is configured to add metadata to the at least one data object, the metadata including one or more of time and a location of the DSoM.

8. The DSoM of claim 7, wherein the DSoM is configured to one or more of compress and encrypt the data object based upon, at least in part, the communication policy received from the computing device and the metadata appended to the at least one data object.

9. The DSoM of claim 1, wherein the at least one data object is a JavaScript Object Notation (JSON) object.

10. The DSoM of claim 1, wherein the DSoM is further configured to:
  receive, via the wireless cellular transceiver, firmware data in the form of the at least one data object for storage in the memory of the DSoM; and
  receive one or more commands from the computing device to transmit at least a portion of the received firmware data to the computing device for installing the received firmware data on the computing device.

11. The DSoM of claim 1, wherein the DSoM is further configured to one or more of enable and disable the power of its wireless cellular transceiver.

12. The DSoM of claim 1, wherein the DSoM further comprises a global navigation satellite system (GNSS) system and is further configured to be communicatively coupled to a GNSS antenna.

13. The DSoM of claim 12, further comprising an accelerometer configured to cause the DSoM to sample GNSS position data from the GNSS system when the accelerometer detects movement.

14. The DSoM of claim 1, wherein at fabrication, non-volatile memory of the DSoM is configured to include one or more security keys and a digitally-signed certificate enabling secure authentication of the DSoM and communication with the cloud-based service.

15. A data system-on-module (DSoM) for communicatively coupling a computing device with a cloud-based service to synchronize one or more data modifications on an asynchronous basis with respect to one another, the DSoM configured to be communicatively coupled directly to the computing device and comprising:
  a wireless cellular transceiver;
  wherein the DSoM is configured to:
    A) transmit one or more data objects from the computing device to the cloud-based service, including:
      receiving at least one data object from the computing device,
      modifying at least one data object array of one or more data objects stored in memory of the DSoM based upon, at least in part, the received at least one data object,
      asynchronously, with respect to the computing device, transmitting, via the wireless cellular transceiver, at least a portion of the modified at least one data object array to a communication hub corresponding to the DSoM that is configured to communicate with the cloud-based service; and
    B) receive one or more data objects from the cloud-based service, including:
      asynchronously, with respect to the computing device, receiving, via the wireless cellular transceiver, at least a portion of the at least one data object array from the communication hub corresponding to the DSoM,
      modifying one or more data objects of the at least one data object array stored in the memory of the DSoM based upon, at least in part, the received at least a portion of the at least one data object array, and
      asynchronously, with respect to the DSoM's communications with the cloud-based service, making the one or more modified data objects of the at least one data object array available to the computing device.

16. The DSoM of claim 15, wherein the computing device is a microcontroller.

17. The DSoM of claim 15, wherein the computing device is configured to be communicatively coupled to the communication device via a serial link.

18. The DSoM of claim 15, wherein the at least one data object is a JavaScript Object Notation (JSON) object.

19. A data system-on-module (DSoM) configured to be communicatively coupled to a computing device via a serial link wherein the DSoM is configured to:
- communicate one or more JavaScript Notation Objects (JSON) objects with the computing device via the serial link based upon, at least in part, a power management policy received from the computing device defining when to receive and/or transmit the one or more JSON objects using the DSoM; and
- asynchronously, with respect to the communication with the computing device, communicate the one or more JSON objects with a communication hub corresponding to the DSoM based upon, at least in part, the power management policy received from the computing device, wherein the communication hub is configured to communicate the one or more JSON objects with a cloud-based service.

* * * * *